United States Patent
Baba

(10) Patent No.: US 10,330,888 B2
(45) Date of Patent: Jun. 25, 2019

(54) IMAGING DEVICE AND ELECTRONIC APPARATUS

(75) Inventor: Tomohiko Baba, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 462 days.

(21) Appl. No.: 14/006,268

(22) PCT Filed: Apr. 26, 2012

(86) PCT No.: PCT/JP2012/061190
§ 371 (c)(1),
(2), (4) Date: Sep. 19, 2013

(87) PCT Pub. No.: WO2012/147841
PCT Pub. Date: Nov. 1, 2012

(65) Prior Publication Data
US 2014/0015997 A1    Jan. 16, 2014

(30) Foreign Application Priority Data

Apr. 26, 2011 (JP) ................ 2011-098113
Nov. 9, 2011 (JP) ................ 2011-245392

(51) Int. Cl.
*G02B 27/14* (2006.01)
*G02B 13/00* (2006.01)
(Continued)

(52) U.S. Cl.
CPC ......... *G02B 13/001* (2013.01); *G02B 13/003* (2013.01); *G02B 13/0035* (2013.01);
(Continued)

(58) Field of Classification Search
CPC .. H04N 5/2254; H04N 5/2257; G02B 13/006; G02B 13/001; G02B 13/22;
(Continued)

(56) References Cited

U.S. PATENT DOCUMENTS 5,004,328 A    4/1991  Suzuki et al.
5,689,376 A *  11/1997 Lewis ............... G02B 9/08
                                              359/717
(Continued)

FOREIGN PATENT DOCUMENTS

JP    63-096617    4/1988
JP    63-096618    4/1988
(Continued)

OTHER PUBLICATIONS

International Search Report; International Application No. PCT/JP2012/061190; Filed: Apr. 26, 2012; dated Jul. 10, 2012 (Form PCT/ISA/210).
(Continued)

*Primary Examiner* — Mahidere S Sahle
(74) *Attorney, Agent, or Firm* — Chip Law Group

(57) ABSTRACT

An electronic apparatus includes an imaging device and a signal processing circuit for performing signal processing on an output signal of the imaging device. The imaging device includes one group of lenses, and an imaging element on which an image is formed through the lenses, and the lenses include a first lens having an object side surface in a convex shape projecting to an object side, a transparent body, and a second lens, the first lens, the transparent body, and the second lens being arranged in order from the object side to an image surface side without an air being interposed between the first lens, the transparent body, and the second lens, and the imaging element is curved so as to have a concave surface facing the object side.

14 Claims, 35 Drawing Sheets

(51) Int. Cl.
*G02B 13/14* (2006.01)
*H04N 5/357* (2011.01)
*H04N 5/369* (2011.01)

(52) U.S. Cl.
CPC ............ *G02B 13/14* (2013.01); *H04N 5/3572* (2013.01); *H04N 5/3696* (2013.01)

(58) Field of Classification Search
CPC .... G02B 27/0025; G02B 3/00; G02B 3/0068; G02B 9/34; G02B 13/0035; G02B 13/0085; G02B 13/003; G02B 13/18; G02B 13/004; G02B 27/0056; G02B 27/42; G02B 27/4211; G02B 27/4216; G02B 13/14
USPC ..... 348/360, 222.1, 335, 294; 359/642, 764, 359/576, 754, 796, 637, 726, 364, 366, 359/664, 716, 738, 739, 784, 793, 794
See application file for complete search history.

(56) References Cited

U.S. PATENT DOCUMENTS

| | | | |
|---|---|---|---|
| 6,349,171 | B1 | 2/2002 | Koike |
| 8,000,038 | B2 | 8/2011 | Hirao et al. |
| 2002/0181121 | A1* | 12/2002 | Kawakami ............... G02B 9/34 359/689 |
| 2003/0020822 | A1* | 1/2003 | Sato .................. G02B 13/0025 348/335 |
| 2009/0040626 | A1* | 2/2009 | Oh ........................ G02B 13/18 359/716 |
| 2009/0225441 | A1* | 9/2009 | Do .................... G02B 13/0035 359/716 |
| 2010/0091387 | A1 | 4/2010 | Hirao et al. |
| 2010/0134903 | A1 | 6/2010 | Hirao et al. |
| 2010/0134905 | A1 | 6/2010 | Hirao et al. |
| 2010/0166413 | A1 | 7/2010 | Hirao et al. |
| 2010/0188555 | A1* | 7/2010 | Hirao ................ G02B 13/0035 348/340 |
| 2010/0277627 | A1* | 11/2010 | Duparre ............ H01L 27/14603 348/262 |
| 2010/0315724 | A1 | 12/2010 | Fukuta et al. |
| 2010/0321554 | A1* | 12/2010 | Hirao ...................... G02B 7/08 348/340 |
| 2010/0321794 | A1 | 12/2010 | Hirao et al. |
| 2011/0001865 | A1 | 1/2011 | Hirao et al. |
| 2011/0102899 | A1 | 5/2011 | Taeko et al. |

FOREIGN PATENT DOCUMENTS

| | | |
|---|---|---|
| JP | 2000-347352 | 12/2000 |
| JP | 2004-312239 | 11/2004 |
| JP | 2008-233884 | 10/2008 |
| JP | 4293291 | 4/2009 |
| JP | 2009-157402 | 7/2009 |
| JP | 2009-223251 | 10/2009 |
| JP | 2009-301046 | 12/2009 |
| JP | 2010-002921 | 1/2010 |
| JP | 2010-066445 | 3/2010 |
| JP | 2010-266815 | 11/2010 |
| JP | 2011-017764 | 1/2011 |
| JP | 2011-039560 | 2/2011 |
| JP | 2011-081102 | 4/2011 |
| JP | 2011-081315 | 4/2011 |
| JP | 2011-203313 | 10/2011 |
| WO | WO-2001/63915 | 8/2001 |
| WO | WO-2009/104669 | 8/2009 |
| WO | WO-2010/087084 | 8/2010 |
| WO | WO-2010/143458 | 12/2010 |
| WO | WO-2011/043023 | 4/2011 |

OTHER PUBLICATIONS

Written Opinion of the International Searching Authority; International Application No. PCT/JP2012/061190; International Filing Date: Apr. 26, 2012; dated Jul. 10, 2012. (Form PCT/ISA/220 and PCT/ISA/237).

* cited by examiner

IMAGING DEVICE AND ELECTRONIC APPARATUS

TECHNICAL FIELD

The present technology relates to an imaging device applied to an imaging apparatus and an electronic apparatus.

BACKGROUND ART

High resolution, low cost, and miniaturization have been strongly demanded for imaging apparatuses mounted in mobile telephones, personal computers (PC), and the like in recent years.

The cell pitches of imaging elements such as CCD (Charge Coupled Device) and CMOS (Complementary Metal Oxide Semiconductor) image sensors and the like have been dramatically decreased, and optical systems are required to have high image forming performance that suppresses optical aberrations, particularly axial chromatic aberration more than ordinary optical systems.

However, when these problems are to be solved by only a lens system, the number of lenses is increased, and high assembly accuracy is required.

The problem of a need to make the lenses so small as to be unmanufacturable, for example, occurs.

One method for solving these problems is to curve an imaging element to reduce a need for image surface correction by the optical system, and simplify the lenses. A technology disclosed in Patent Document 1 is known as a typical example of the method.

In this example, in which a technology relating to optical design of a one-group, two-lens configuration is described, two plastic molds molded separately are laminated to each other, and a front diaphragm is formed. To be exact, a two-group, two-lens configuration is formed because of the presence of an air interval between groups. In addition, no infrared cutoff filter is inserted.

CITATION LIST

Patent Literature

[PTL 1]
Japanese Patent Laid-Open No. 2004-312239

SUMMARY

Technical Problem

However, because the above-described technology curves the imaging element, there is for example a problem of not presenting a method for solving barrel optical distortion, which is generated by curving the imaging element, so that provision can be made for only low pixel counts under a CIF standard, a VGA standard, and the like. It is also difficult to achieve a wider angle.

The present technology is to provide an imaging device in which provision can be made for a high pixel count and a wide angle with a small size and high resolution at low cost, and an electronic apparatus.

Solution to Problem

According to a first viewpoint of the present technology, there is provided an imaging device including: one group of lenses; and an imaging element on which an image is formed through the lenses; wherein the lenses include a first lens having an object side surface in a convex shape projecting to an object side, a transparent body, and a second lens, the first lens, the transparent body, and the second lens being arranged in order from the object side to an image surface side without an air being interposed between the first lens, the transparent body, and the second lens, and the imaging element is curved so as to have a concave surface facing the object side. In addition, an imaging device includes: a lens group having a positive optical distortion; and an imaging element on which an image is formed through the lens group; wherein the imaging element is curved so as to have a concave surface facing an object side, and a negative optical distortion produced by the curvature of the imaging element is cancelled out by the positive optical distortion of the lens group.

According to a second viewpoint of the present technology, there is provided an electronic apparatus including: an imaging device; and a signal processing circuit for performing signal processing on an output signal of the imaging device; wherein the imaging device includes one group of lenses, and an imaging element on which an image is formed through the lenses, and the lenses include a first lens having an object side surface in a convex shape projecting to an object side, a transparent body, and a second lens, the first lens, the transparent body, and the second lens being arranged in order from the object side to an image surface side without an air being interposed between the first lens, the transparent body, and the second lens, and the imaging element is curved so as to have a concave surface facing the object side.

In addition, an electronic apparatus includes: an imaging device; and a signal processing circuit for performing signal processing on an output signal of the imaging device; wherein the imaging device includes a lens group having a positive optical distortion, and an imaging element on which an image is formed through the lens group, and the imaging element is curved so as to have a concave surface facing an object side, and a negative optical distortion produced by the curvature of the imaging element is cancelled out by the positive optical distortion of the lens group.

Advantageous Effect of Invention

According to the present technology, it is possible to make provision for a high pixel count and a wide angle with a small size and high resolution at low cost.

DESCRIPTION OF EMBODIMENTS

Embodiments of the present technology will hereinafter be described with reference to the accompanying drawings. Incidentally, description will be made in the following order.

1. First embodiment (first example of configuration of an imaging device)
2. Second embodiment (second example of configuration of an imaging device)
3. Third embodiment (third example of configuration of an imaging device)
4. Fourth embodiment (fourth example of configuration of an imaging device)
5. Fifth embodiment (fifth example of configuration of an imaging device)
6. Sixth embodiment (sixth example of configuration of an imaging device)
7. Seventh embodiment (seventh example of configuration of an imaging device)
8. Eighth embodiment (eighth example of configuration of an imaging device)
9. Ninth embodiment (ninth example of configuration of an imaging device)
10. Tenth embodiment (tenth example of configuration of an imaging device)
11. Eleventh embodiment (concept of wafer opt)
12. Twelfth embodiment (example of configuration of an electronic apparatus)

1. First Embodiment

Figure 1:
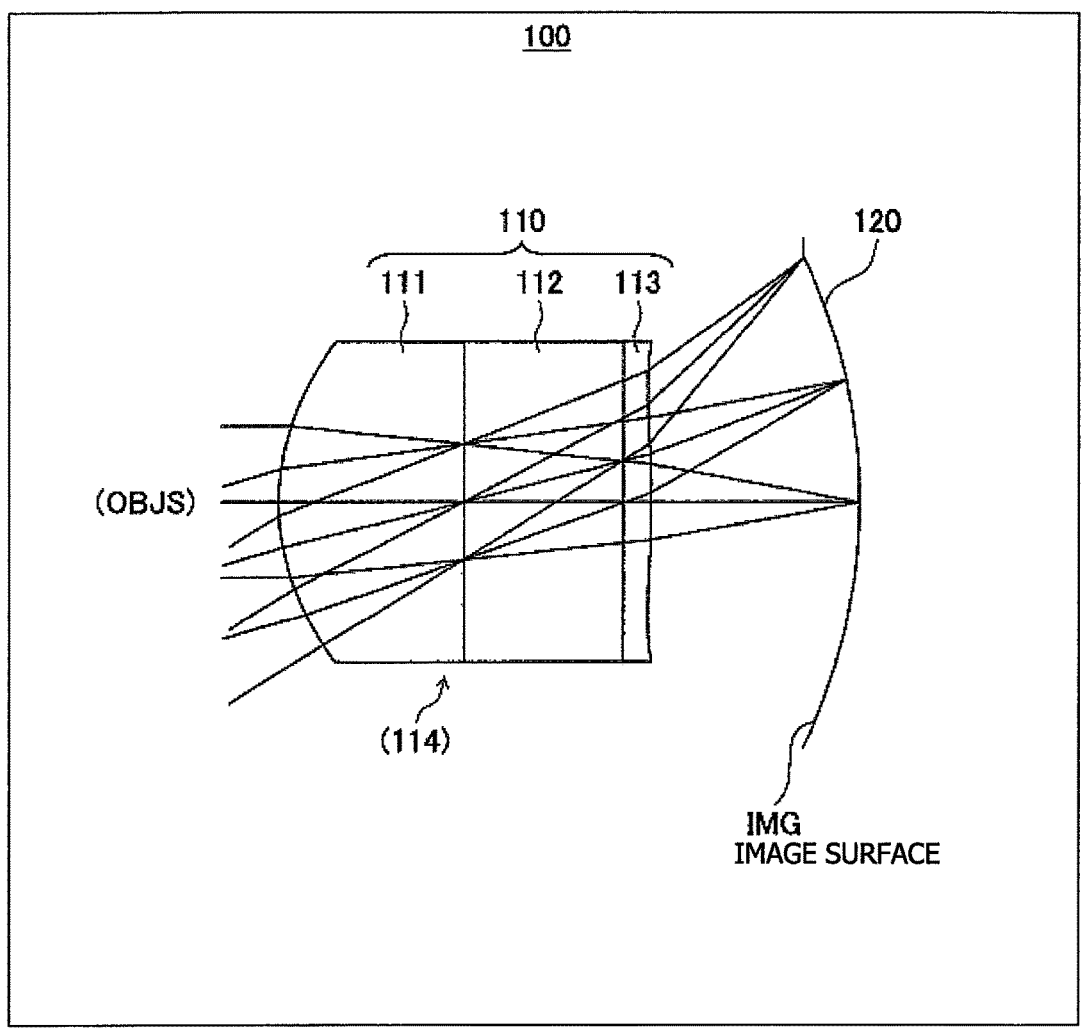
FIG. 1 is a diagram showing an example of configuration of an imaging device according to a first embodiment of the present technology.

FIG. 1 is a diagram showing an example of configuration of an imaging device according to a present first embodiment.

As shown in FIG. 1, the imaging device 100 according to the present first embodiment includes a lens 110 and an imaging element 120 arranged in order from an object side OBJS to an image surface side.

This lens 110 is formed as a single focus lens.

The present imaging device 100 basically includes the imaging element 120 curved so as to have a concave surface facing the object side and one group of lenses 110.

The lenses 110 include a first lens 111 whose object side surface has a convex shape projecting to the object side, a glass substrate 112 as a transparent body provided with a diaphragm and an infrared cutoff filter, and a second lens 113, with the first lens 111, the glass substrate 112, and the second lens 113 arranged in order from the object side to the image surface side without an air being interposed therebetween.

The first lens 111 is desirably realized by providing an ultraviolet (UV) curing replica lens on the glass substrate 112.

In addition, a doublet configuration can be adopted by providing a different replica glass material twice, or a triplet configuration can be adopted by providing a different replica glass material three times, to improve performance. Configurations more than the triplet configuration are also possible.

The second lens 113 is desirably realized by providing a UV curing replica lens on the glass substrate 112 on the back side of the first lens 111.

In addition, a doublet configuration may be adopted by providing a different replica glass material twice, or a triplet configuration or more may be adopted by providing a different replica glass material three times or more.

As for a power arrangement, the first lens 111 has a strong positive power, and the second lens 113 has a weak positive or weak negative power.

There is a diaphragm 114 between the first lens 111 and the second lens 113.

Therefore, negative (barrel) optical distortion generated by curving the imaging element is cancelled out by generating strong positive (pincushion) optical distortion in the lens group due to effect of the above-described power arrangement, so that desirable optical distortion is realized on the imaging element as a whole. Incidentally, the optical distortion of the lens group is positive 4% or more.

The lens 110 as a single focus lens assumes that an imaging surface (image receiving surface) of a solid-state imaging element such as a CCD sensor, a CMOS sensor, or the like is disposed as an image surface IMG.

In addition, not only a cover glass formed of resin or glass, an infrared cutoff filter, a low-pass filter, and the like but also an optical member may be disposed between a last surface on the image side and the image forming surface or in front of a first surface on the object side.

Incidentally, in the present embodiment, in FIG. 1, a left side is the object side (front), and a right side is the image surface side (rear).

In addition, a light flux incident from the object side forms an image on the image surface IMG of the imaging element 120.

The configuration and effect of the imaging lens according to the present embodiment will be described in the following.

The imaging lens 110 according to the present embodiment as a single focus lens is configured to satisfy the following conditional expressions (1) to (3).

The conditional expression (1) defines a condition related to the power of the first lens 111.

$$1.0 \leq fL1/f \leq 100.0 \quad (1)$$

where fL1 denotes the focal length of the first lens 111, and f denotes the focal length of the lens system.

The conditional expression (1) is necessary for the following reasons.

When the upper limit is exceeded, positive (pincushion) optical distortion is not produced, and thus the system produces optical distortion. In addition, an angle of incidence on the first surface of incidence on the object side differs for each image height, chromatic aberration is produced, and thus desirable optical characteristics are not obtained. The conditional expression (1) is therefore necessary.

When the lower limit is exceeded, the surface shape of the first surface of incidence on the object side becomes a strongly curved surface, and cannot be manufactured. The conditional expression (1) is therefore necessary.

The conditional expression (2) defines a condition related to the power of the second lens 113.

$$1.5 \leq fL2/f \text{ or } fL2 \leq -3.0 \quad (2)$$

where fL2 denotes the focal length of the second lens 113, and f denotes the focal length of the lens system.

The conditional expression (2) is necessary for the following reasons.

When the upper limit of the expression with respect to the negative is exceeded, an angle of light incident on the imaging element is increased, and thus desirable camera characteristics are not obtained. The conditional expression (2) is therefore necessary.

When the lower limit of the expression with respect to the positive is exceeded, positive (pincushion) optical distortion is not produced, and thus the system produces optical distortion. The conditional expression (2) is therefore necessary.

The conditional expression (3) defines a condition related to the curvature of the imaging element 120.

$$-5 \leq Ri/f \leq -0.6 \quad (3)$$

where Ri denotes the radius of curvature of the image surface IMG.

The conditional expression (3) is necessary for the following reasons.

When the upper limit is exceeded, field curvature cannot be completely corrected by the lens, and an MTF is degraded as the image height is increased. The conditional expression (3) is therefore necessary. When the lower limit is exceeded, the field curvature is corrected excessively, the MTF is degraded as the image height is increased, and it is difficult to achieve the curvature in manufacturing. The conditional expression (3) is therefore necessary.

The above conditional expressions (1) to (3) are common to a first example, a second example, a third example, a fourth example, and a fifth example according to the first to fifth embodiments to be dealt with in the following, and are used appropriately as required to realize more desirable image forming performance and a compact optical system suitable for each individual imaging element or imaging device.

Incidentally, assuming that a direction from the object side to the image surface side is positive, k is a conic constant, A, B, C and D are aspheric coefficients, and r is the radius of curvature of a center, the shape of the aspheric surface of a lens is expressed by the following expression. y represents the height of light from an optical axis, and c represents the inverse (1/r) of the radius of curvature r of the center.

Aspheric Surface Equation [Math. 1]

$$X = \frac{cy^2}{1 + \sqrt{1-(1+k)c^2y^2}} + Ay^4 + By^6 + Cy^8 + Dy^{10}$$

where X represents a distance from a tangent plane with respect to the vertex of the aspheric surface, A represents a fourth-order aspheric coefficient, B represents a sixth-order aspheric coefficient, C represents an eighth-order aspheric coefficient, and D represents a tenth-order aspheric coefficient.

Figure 2:
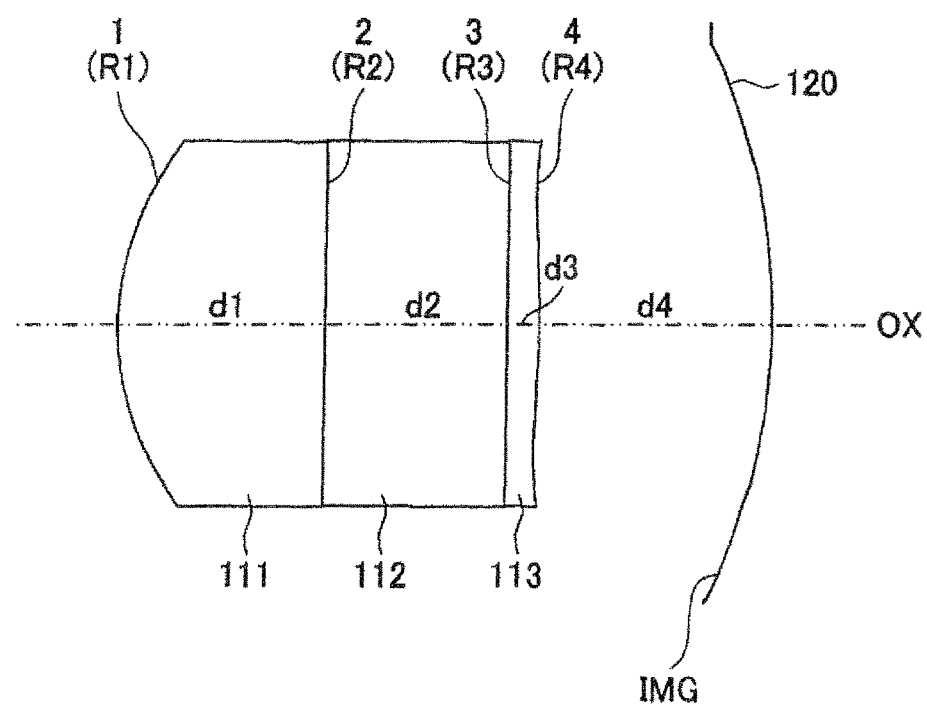
FIG. 2 is a diagram showing surface numbers given to the lenses and the substrate of the imaging device according to the present first embodiment.

FIG. 2 is a diagram showing surface numbers given to the lenses and the substrate of the imaging device according to the present first embodiment.

Specifically, a surface number of number one is given to the object side surface (convex surface) of the first lens 111, and a surface number of number two is given to a boundary surface (bonding surface) between the image surface side surface of the first lens 111 and the object side surface of the glass substrate 112.

A surface number of number three is given to a boundary surface (bonding surface) between the image surface side surface of the glass substrate 112 and the object side surface of the second lens 113, and a surface number of number four is given to the image surface side surface of the second lens 113.

In addition, as shown in FIG. 2, in the lens 100 of the present embodiment, the radius of curvature of the center of the object side surface (number one) 1 of the first lens 111 is set as R1.

The radius of curvature of the center of the boundary surface (bonding surface) 2 between the image surface side surface of the first lens 111 and the object side surface of the glass substrate 112 is set as R2.

The radius of curvature of the center of the boundary surface (bonding surface) 3 between the image surface side surface of the glass substrate 112 and the object side surface of the second lens 113 is set as R3.

The radius of curvature of the center of the image surface side surface 4 of the second lens 113 is set as R4.

Incidentally, the radii of curvature R2 and R3 of the centers of the surfaces 2 and 3 are infinite (INFINITY).

In addition, as shown in FIG. 2, a distance on the optical axis OX between the surface 1 and the surface 2 as thickness of the first lens 111 is set as d1, and a distance on the optical axis OX between the surface 2 and the surface 3 as thickness of the glass substrate 112 is set as d2.

A distance on the optical axis OX between the surface 3 and the surface 4 as thickness of the second lens 113 is set as d3, and a distance on the optical axis OX between the image surface side surface of the second lens 113 and the image surface IMG is set as d4.

A first example based on concrete numerical values of the lens 110 of the imaging device 100 is shown in the following. Incidentally, in the first example, the surface numbers as shown in FIG. 2 are given to the lenses and the glass substrate of the lens 110.

First Example

The numerical values of the first example are shown in Table 1, Table 2, Table 3, and Table 4. The numerical values of the first example correspond to the lens 110 of FIG. 1.

The first example is a design example for a 3-megapixel (Mega pixel) CMOS imager having a ⅙ size and a 1.1-μm pitch.

As described above, the present first example includes the imaging element 120 curved so as to have a concave surface facing the object side and one group of lenses 110.

The lenses 110 include the first lens 111 whose object side surface has a convex shape projecting to the object side, the glass substrate 112 provided with a diaphragm and an infrared cutoff filter, and the second lens 113, with the first lens 111, the glass substrate 112, and the second lens 113 arranged in order from the object side to the image surface side without an air being interposed therebetween.

The first lens 111 is desirably realized by providing an ultraviolet (UV) curing replica lens on the glass substrate 112. The second lens is desirably realized by providing the UV curing replica lens on the glass substrate 112 on the back side of the first lens 111. The first lens 111 and the second lens 113 can be formed on a D263T glass substrate from Schott by a replica process using an NT33 glass material manufactured by Nitto Denko Corporation, for example.

As for a power arrangement, the first lens 111 has a strong positive power and a focal length of 4.1 mm, and the second lens 113 has a weak positive power and a focal length of 9.9 mm.

Figure 4:
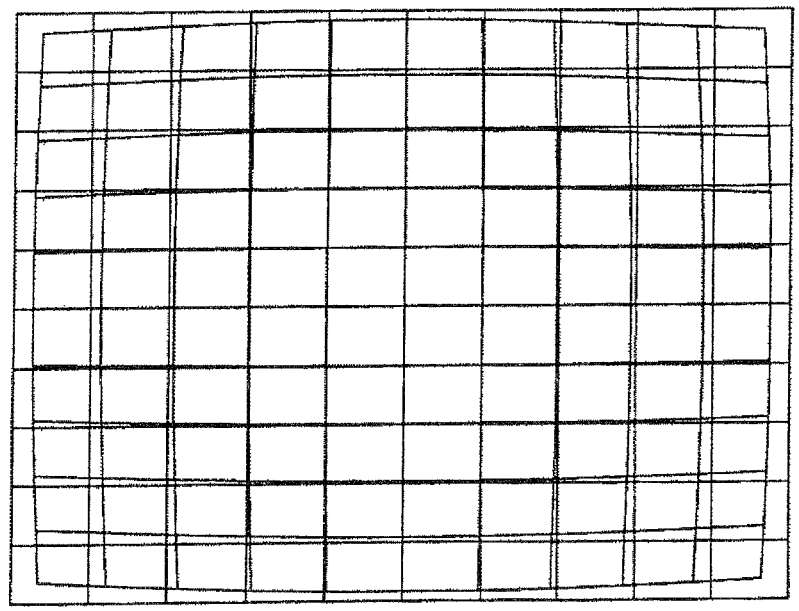
FIG. 4 is a diagram showing a distortion grid in the first example.

Though the imaging element 120 is a factor in generating large barrel optical distortion due to the curvature having a radius of 3.114 mm, the diaphragm 114 is present between the first lens 111 and the second lens 113. Therefore, due to the effect of the above-described power arrangement, the lens generates a positive (pincushion) optical distortion of 17.3%, and as shown in FIG. 4, the TV distortion of the system is reduced to negative (barrel) 2.0%.

Figure 3:
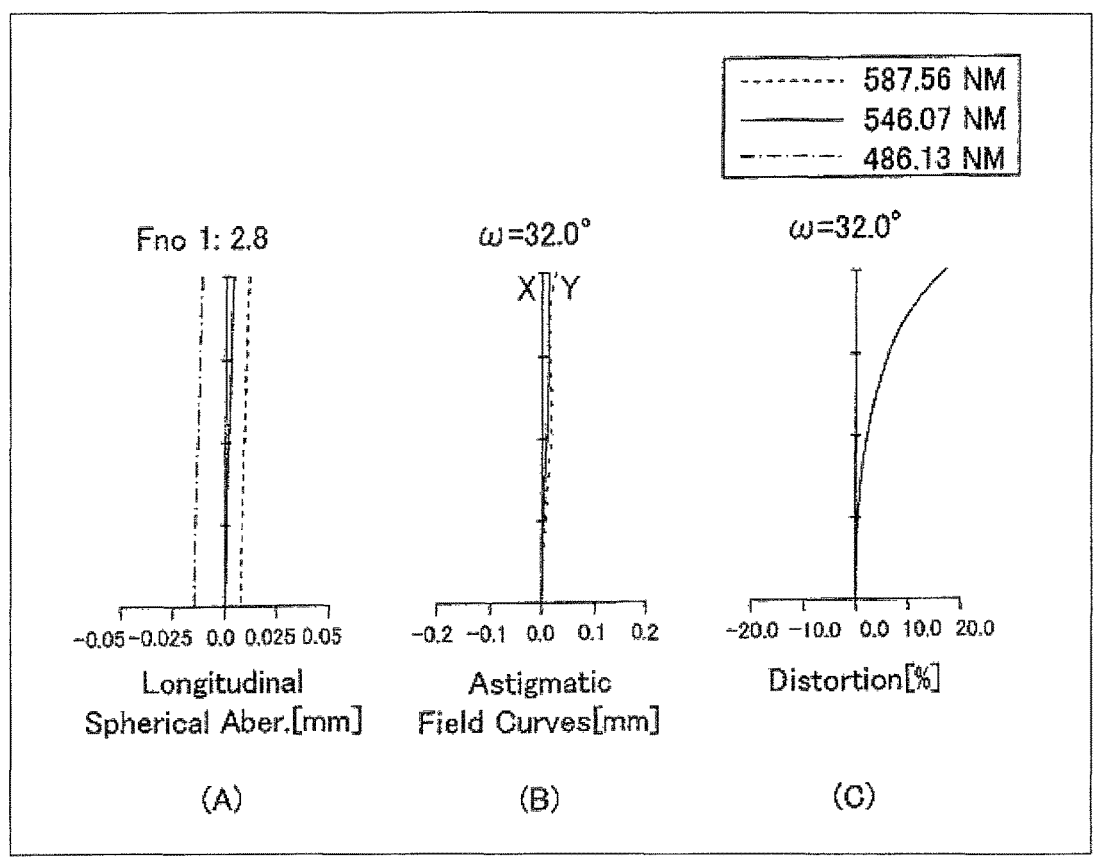
FIG. 3 is an aberration diagram showing spherical aberration (chromatic aberration), astigmatism, and distortion in a first example.

Then, a compact imaging system having a short optical total length of 3.23 mm is realized which corrects optical aberrations well, as shown in FIG. 3, while offering high brightness with an F-number Fno of 2.8 and having a wide angle, that is, a half angle of view of 32 degrees.

Table 1 shows the radii of curvature (R: mm), intervals (d: mm), refractive indices (nd), and dispersion values (vd) of the lenses and the glass substrate (transparent body) that correspond to the surface numbers of the lens 110 in the first example.

TABLE 1

Lens configuration data in the first example

| Surface number | R | d | nd | vd |
|---|---|---|---|---|
| 1: | 1.37 | 1.011 | 1.51 | 57.3 |
| 2: | INFINITY | 0.900 | 1.52 | 55.0 |
| 3: | INFINITY | 0.156 | 1.51 | 57.3 |
| 4: | −5.084 | 1.167 | | |
| IMG: | −3.114 | | | |

Table 2 shows the fourth-order, sixth-order, eighth-order, and tenth-order aspheric coefficients of the surface 1 of the first lens 111 and the surface 4 of the second lens 113, which include an aspheric surface in the first example.

In Table 2, K represents a conic constant, A represents a fourth-order aspheric coefficient, B represents a sixth-order aspheric coefficient, C represents an eighth-order aspheric coefficient, and D represents a tenth-order aspheric coefficient.

TABLE 2

Aspheric surface data in the first example

| | | | | | |
|---|---|---|---|---|---|
| First surface | K: −0.630 | A: 0.579E−02 | B: 0.156E−01 | C: −0.285E−01 | D: 0.102E−01 |
| Fourth surface | K: −0.599 | A: 0.142E+00 | B: −0.835E−01 | C: 0.112E+00 | D: −0.491E−01 |

Table 3 specifically shows the focal length f, numerical aperture F, half angle of view ω, and lens length H of the lens 110 in the first example.

In this case, the focal length f is set to 2.36 [mm], the numerical aperture F is set to 2.8, the half angle of view ω is set to 32.0 deg, and the lens length H is set to 3.23 [mm].

TABLE 3

| Configuration data in the first example |
|---|
| f (focal length) = 2.36 mm |
| F (numerical aperture) = 2.8 |
| ω (half angle of view) = 32.0 deg |
| H (lens total length) = 3.23 mm |

Table 4 shows that each of the above-described conditional expressions (1) to (3) is satisfied in the first example.

TABLE 4

| Values of conditional expressions in the first example Conditional expression/first example ||
|---|---|
| (1) | 1.72 |
| (2) | 4.21 |
| (3) | −1.31 |

As shown in Table 4, in the first example, the power (fL1/f) of the first lens 111 is set to 1.72, which satisfies the condition defined by the conditional expression (1).

The power (fL2/f) of the second lens 113 is set to 4.21, which satisfies the condition on the positive side which condition is defined by the conditional expression (2). The radius of curvature (Ri) of the image surface IMG of the imaging element 120 is set to −1.31, which satisfies the condition defined by the conditional expression (3).

FIG. 3 is an aberration diagram showing spherical aberration (chromatic aberration), astigmatism, and distortion in the first example. (A) of FIG. 3 shows the spherical aberration (chromatic aberration), (B) of FIG. 3 shows the astigmatism, and (C) of FIG. 3 shows the distortion.

FIG. 4 is a diagram showing a distortion grid in the first example.

As is understood from the figures, according to the first example, an imaging device that excellently corrects spherical aberration, astigmatism, and distortion and includes a lens offering excellent image forming performance is obtained.

2. Second Embodiment

Figure 5:
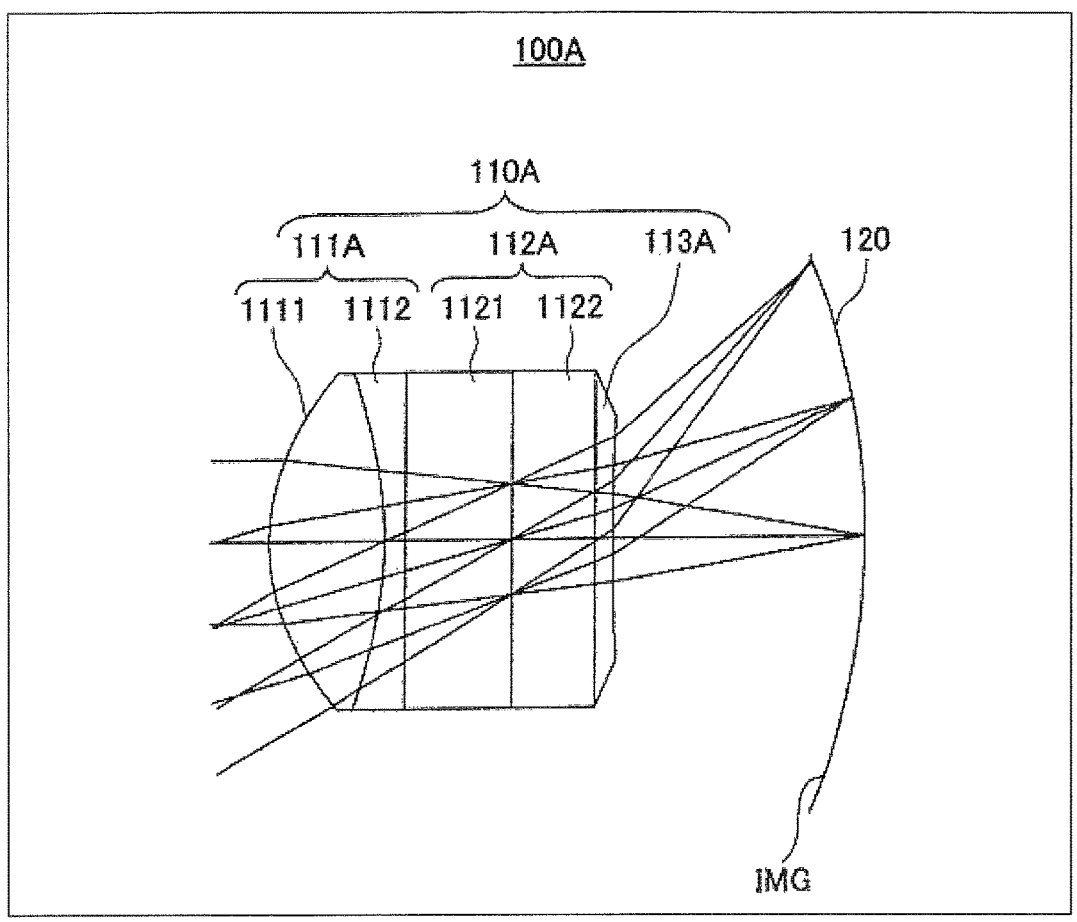
FIG. 5 is a diagram showing an example of configuration of an imaging device according to a present second embodiment.

FIG. 5 is a diagram showing an example of configuration of an imaging device according to a present second embodiment.

The imaging device 100A according to the second embodiment shown in FIG. 5 and the imaging device 100 according to the first embodiment shown in FIG. 1 are different from each other in the following respect.

In the imaging device 100A, a first lens 111A is formed by a first lens element 1111 and a second lens element 1112, and a glass substrate 112A is formed by a first glass substrate 1121 and a second glass substrate 1122. In the second embodiment, the first lens 111A is formed on the first glass substrate 1121, and a second lens 113A is formed on the second glass substrate 1122.

Figure 6:
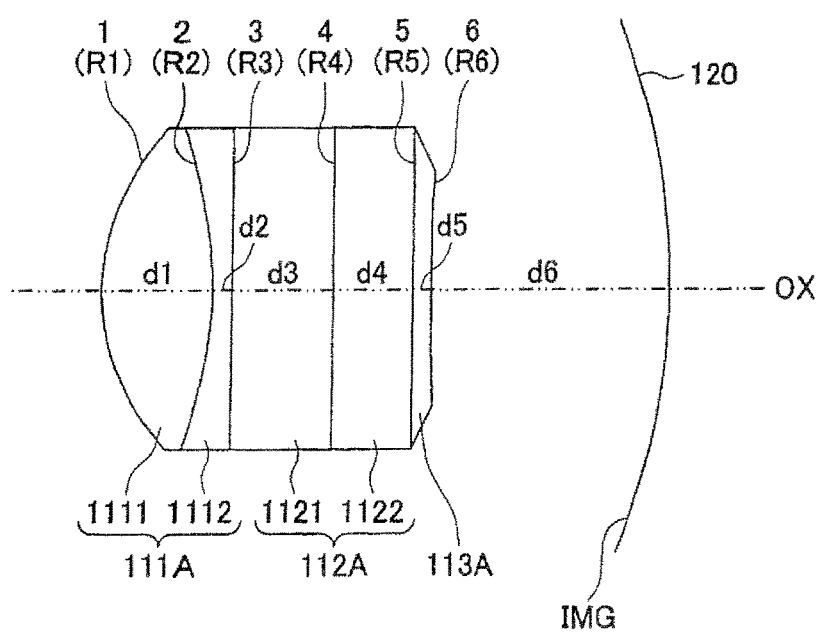
FIG. 6 is a diagram showing surface numbers given to lenses and a substrate forming each lens group of an imaging lens according to the present second embodiment and a cover glass forming an imaging portion.

FIG. 6 is a diagram showing surface numbers given to the lenses and the substrate of the imaging device according to the present second embodiment.

Specifically, a surface number of number one is given to the object side surface (convex surface) of the first lens element 1111, and a surface number of number two is given to a boundary surface (bonding surface) between the image surface side surface of the first lens element 1111 and the object side surface of the second lens element 1112.

A surface number of number three is given to a boundary surface (bonding surface) between the image surface side surface of the second lens element 1112 and the object side surface of the first glass substrate 1121.

A surface number of number four is given to a boundary surface (bonding surface) between the image surface side surface of the first glass substrate 1121 and the object side surface of the second glass substrate 1122.

A surface number of number five is given to a boundary surface (bonding surface) between the image surface side surface of the second glass substrate 1122 and the object side surface of the second lens 113A, and a surface number of number six is given to the image surface side surface of the second lens 113A.

In addition, as shown in FIG. 6, in the lens 110A of the present embodiment, the radius of curvature of the center of the object side surface (number one) 1 of the first lens element 1111 is set as R1.

The radius of curvature of the center of the boundary surface (bonding surface) between the image surface side surface of the first lens element 1111 and the object side surface of the second lens element 1112 is set as R2.

The radius of curvature of the center of the boundary surface (bonding surface) between the image surface side surface of the second lens element 1112 and the object side surface of the first glass substrate 1121 is set as R3.

The radius of curvature of the center of the boundary surface (bonding surface) between the image surface side surface of the first glass substrate 1121 and the object side surface of the second glass substrate 1122 is set as R4.

The radius of curvature of the center of the boundary surface (bonding surface) between the image surface side surface of the second glass substrate 1122 and the object side surface of the second lens 113A is set as R5.

The radius of curvature of the center of the image surface side surface of the second lens 113A is set as R6. Incidentally, the radii of curvature R3, R4, and R5 of the centers of the surfaces 3, 4, and 5 are infinite (INFINITY).

In addition, as shown in FIG. 6, a distance on an optical axis OX between the surface 1 and the surface 2 as thickness of the first lens element 1111 is set as d1.

A distance on the optical axis OX between the surface 2 and the surface 3 as thickness of the second lens element 1112 is set as d2.

A distance on the optical axis OX between the surface 3 and the surface 4 as thickness of the first glass substrate 1121 is set as d3.

A distance on the optical axis OX between the surface 4 and the surface 5 as thickness of the second glass substrate 1122 is set as d4.

A distance on the optical axis OX between the surface 5 and the surface 6 as thickness of the second lens 113A is set as d5. A distance on the optical axis OX between the image surface side surface of the second lens 113A and an image surface IMG is set as d6.

A second example based on concrete numerical values of the lens 110A of the imaging device 100A is shown in the following. Incidentally, in the second example, the surface numbers as shown in FIG. 6 are given to the lenses and the glass substrate of the lens 110A.

Second Example

The numerical values of the second example are shown in Table 5, Table 6, Table 7, and Table 8. The numerical values of the second example correspond to the lens 110A of FIG. 5.

The second example is a design example for a 5-megapixel (Mega pixel) CMOS imager having a ⅕ size and a 1.1-μm pitch.

As described above, the present second example includes an imaging element 120A curved so as to have a concave surface facing an object side and one group of lenses 110A.

The lenses 110A include the first lens 111A whose object side surface has a convex shape projecting to the object side, the glass substrate 112A provided with a diaphragm and an infrared cutoff filter, and the second lens 113A, with the first lens 111A, the glass substrate 112A, and the second lens 113A arranged in order from the object side to an image surface side without an air being interposed therebetween.

In this case, the first lens 111A is formed by the first lens element 1111 as a biconvex lens which lens element 1111 has an Abbe number of 57.3 and the second lens element 1112 of a plano-concave shape which lens element 1112 has an Abbe number of 29.6.

The first lens 111A is desirably realized by providing a UV curing replica lens twice on the glass substrate 1121. The second lens 113A is desirably realized by providing a UV curing replica lens on the glass substrate on the back side of the first lens 111A. Alternatively, as shown in FIG. 5, the second lens 113A may be realized by forming the first lens 111A and the second lens 113A on the separate substrates 1121 and 1122 and bonding the flat surfaces of the substrates to each other.

The first lens 111A can be formed on a D263T glass substrate from Schott by performing a replica process twice using an NT33 glass material manufactured by Nitto Denko Corporation and a 414C glass material manufactured by Asahi Kasei Corporation, for example. Then, the second lens 113A can be formed on the back side of the first lens 111A by a replica process using the NT33 glass material manufactured by Nitto Denko Corporation.

As for a power arrangement, the first lens 111A has a strong positive power and a focal length of 4.9 mm, and the second lens 113A has a weak positive power and a focal length of 71.2 mm.

Figure 8:
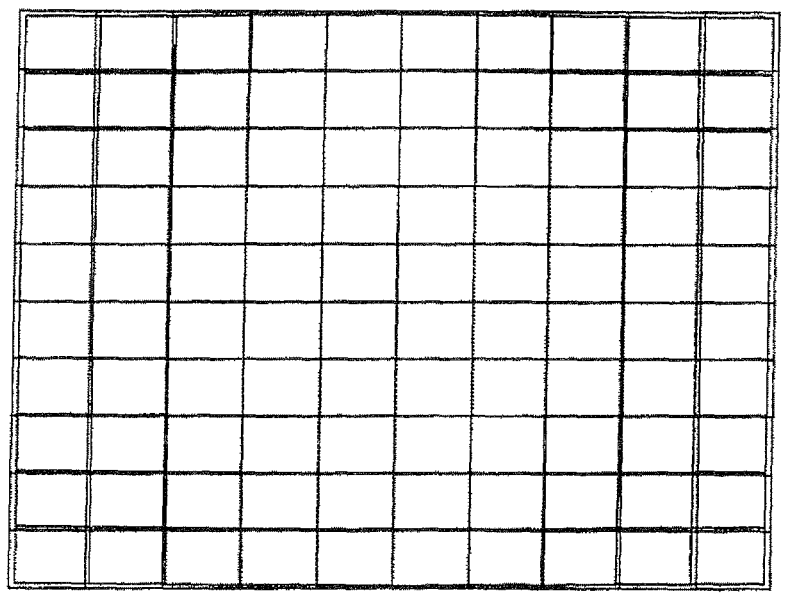
FIG. 8 is a diagram showing a distortion grid in the second example.

Though the imaging element 120A is a factor in generating large barrel optical distortion due to the curvature having a radius of 4.8 mm, there is a diaphragm between the first lens element 1111 and the second lens element 1112. Therefore, due to the effect of the above-described power arrangement, the lens generates a positive (pincushion) optical distortion of 24.5%, and as shown in FIG. 8, the TV distortion of the system is reduced to negative (barrel) 0.4%.

Figure 7:
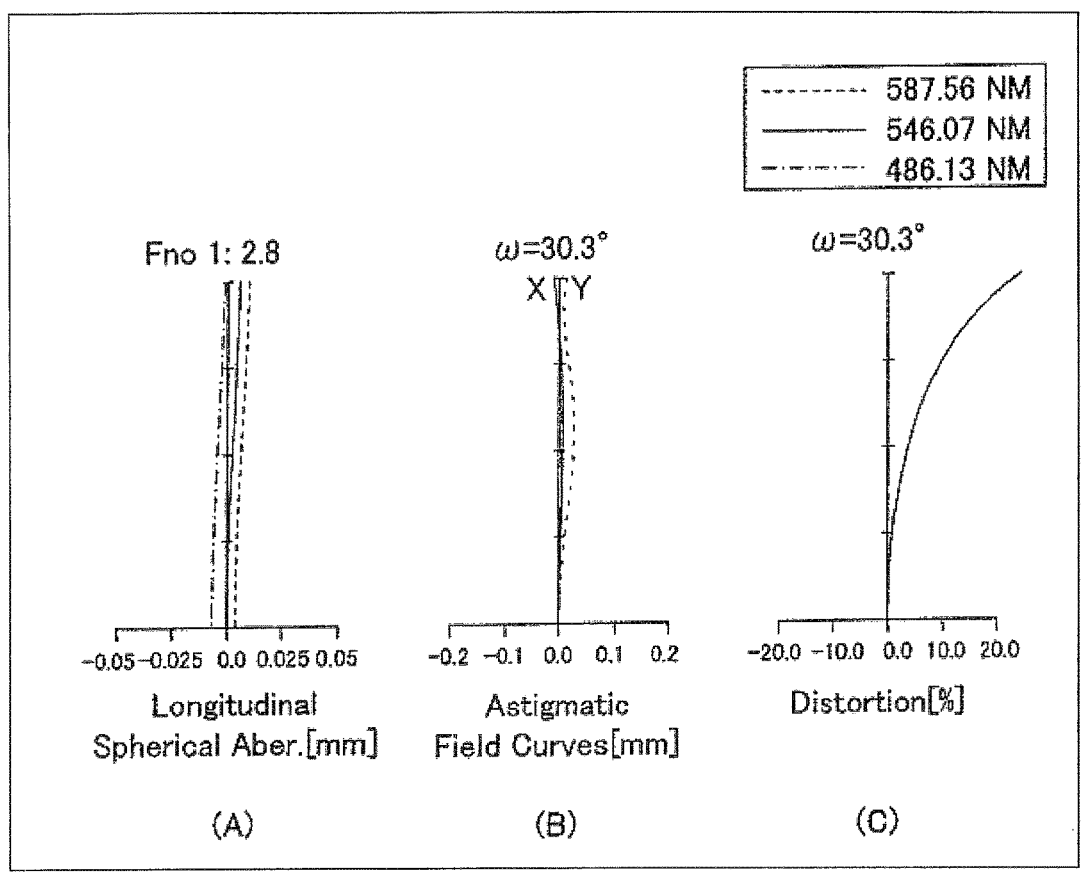
FIG. 7 is an aberration diagram showing spherical aberration (chromatic aberration), astigmatism, and distortion in a second example.

Then, a compact imaging system having a short optical total length of 3.90 mm is realized which corrects optical aberrations well, as shown in FIG. 7, while offering high brightness with an F-number Fno of 2.8 and having a wide angle, that is, a half angle of view of 30.3 degrees.

Table 5 shows the radii of curvature (R: mm), intervals (d: mm), refractive indices (nd), and dispersion values (vd) of the lenses and the glass substrate (transparent body) that correspond to the surface numbers of the lens 110A in the second example.

TABLE 5

Lens configuration data in the second example

| Surface number | R | d | nd | vd |
|---|---|---|---|---|
| 1: | 1.490 | 0.746 | 1.51 | 57.3 |
| 2: | INFINITY | 0127 | 1.59 | 29.6 |
| 3: | INFINITY | 0.700 | 1.52 | 55.0 |
| 4: | INFINITY | 0.550 | 1.52 | 55.0 |
| 5: | INFINITY | 0.126 | 1.51 | 57.3 |
| 6: | −36.475 | 1.650 | | |
| IMG: | −4.800 | | | |

Table 6 shows the fourth-order, sixth-order, eighth-order, and tenth-order aspheric coefficients of the surface 1 and surface 2 of the first lens 111A and the surface 6 of the second lens 113A, which include an aspheric surface in the second example.

In Table 6, K represents a conic constant, A represents a fourth-order aspheric coefficient, B represents a sixth-order aspheric coefficient, C represents an eighth-order aspheric coefficient, and D represents a tenth-order aspheric coefficient.

TABLE 6

Aspheric surface data in the second example

| | | | | |
|---|---|---|---|---|
| First surface | K: −0.431 A: 0.304E−02 | B: −0.623E−03 | C: 0.305E−02 | D: −0.302E−02 |
| Second surface | K: −1.000 A: 0.854E−01 | B: −0.811E−01 | C: 0.561E−01 | D: −0.157E−01 |
| Sixth surface | K: −1.000 A: 0.147E+00 | B: −0.367E+00 | C: 0.829E+00 | D: −0.745E+00 |

Table 7 specifically shows the focal length f, numerical aperture F, half angle of view ω, and lens length H of the lens 110A in the second example.

In this case, the focal length f is set to 3.12 mm, the numerical aperture F is set to 2.8, the half angle of view ω is set to 30.3 deg, and the lens length H is set to 3.90 mm.

TABLE 7

Configuration data in the second example f (focal length) = 3.12 mm

F (numerical aperture) = 2.8

ω (half angle of view) = 30.3 deg

H (lens total length) = 3.90 mm

Table 8 shows that each of the above-described conditional expressions (1) to (3) is satisfied in the second example.

TABLE 8

Values of conditional expressions in the second example
Conditional expression/second example

| | |
|---|---|
| (1) | 1.56 |
| (2) | 22.82 |
| (3) | −1.53 |

As shown in Table 8, in the second example, the power (fL1/f) of the first lens 111A is set to 1.56, which satisfies the condition defined by the conditional expression (1).

The power (fL2/f) of the second lens 113A is set to 22.82, which satisfies the condition on the positive side which condition is defined by the conditional expression (2).

The radius of curvature (Ri) of the image surface IMG of the imaging element 120A is set to −1.53, which satisfies the condition defined by the conditional expression (3).

FIG. 7 is an aberration diagram showing spherical aberration (chromatic aberration), astigmatism, and distortion in the second example. (A) of FIG. 7 shows the spherical aberration (chromatic aberration), (B) of FIG. 7 shows the astigmatism, and (C) of FIG. 7 shows the distortion.

FIG. 8 is a diagram showing a distortion grid in the second example.

As is understood from the figures, according to the second example, an imaging device that excellently corrects spherical aberration, astigmatism, and distortion and includes a lens offering excellent image forming performance is obtained.

3. Third Embodiment

Figure 9:
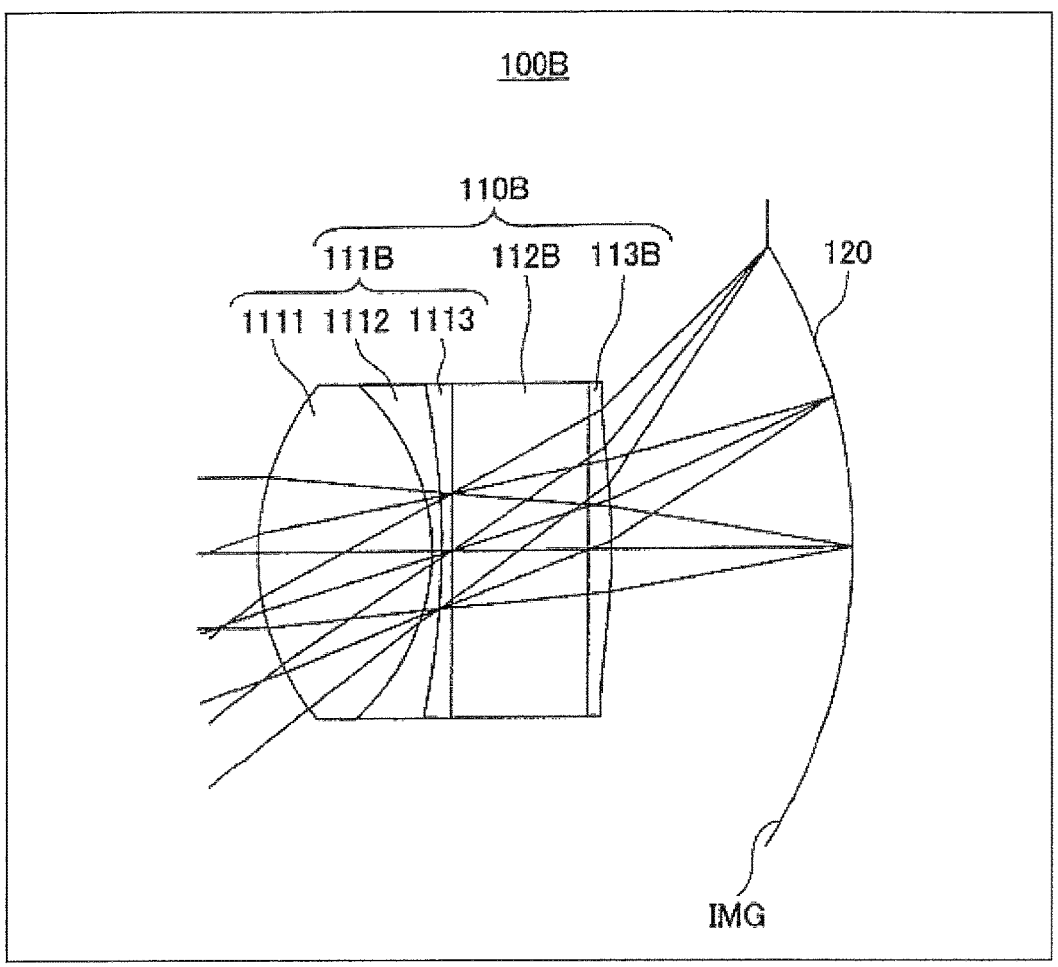
FIG. 9 is a diagram showing an example of configuration of an imaging device according to a present third embodiment.

FIG. 9 is a diagram showing an example of configuration of an imaging device according to a present third embodiment.

The imaging device 100B according to the third embodiment shown in FIG. 9 and the imaging device 100 according to the first embodiment shown in FIG. 1 are different from each other in the following respect.

In the imaging device 100B, a first lens 111B is formed by a first lens element 1111, a second lens element 1112, and a third lens element 1113.

Figure 10:
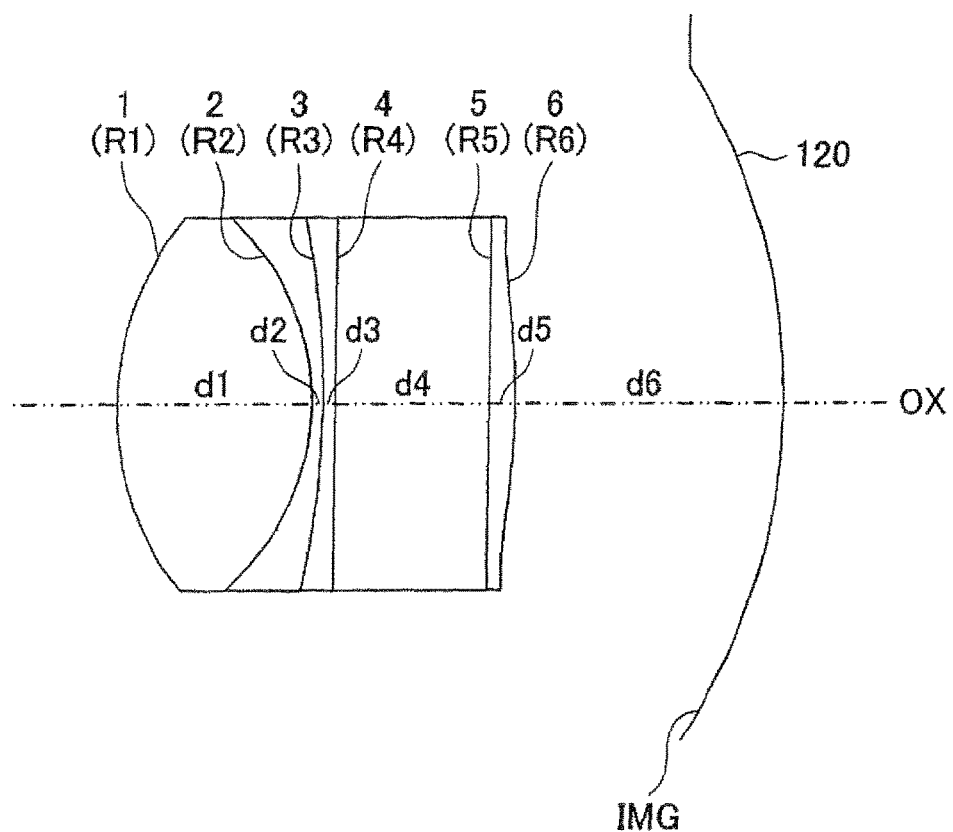
FIG. 10 is a diagram showing surface numbers given to lenses and a substrate forming each lens group of an imaging lens according to the present third embodiment and a cover glass forming an imaging portion.

FIG. 10 is a diagram showing surface numbers given to the lenses and the substrate of the imaging device 100B according to the present third embodiment.

Specifically, a surface number of number one is given to the object side surface (convex surface) of the first lens element 1111, and a surface number of number two is given to a boundary surface (bonding surface) between the image surface side surface of the first lens element 1111 and the object side surface of the second lens element 1112.

A surface number of number three is given to a boundary surface (bonding surface) between the image surface side surface of the second lens element 1112 and the object side surface of the third lens element 1113.

A surface number of number four is given to a boundary surface (bonding surface) between the image surface side surface of the third lens element 1113 and the object side surface of a glass substrate 112B.

A surface number of number five is given to a boundary surface (bonding surface) between the image surface side surface of the glass substrate 112B and the object side surface of a second lens 113B, and a surface number of number six is given to the image surface side surface of the second lens 113B.

In addition, as shown in FIG. 10, in the lens 110B of the present embodiment, the radius of curvature of the center of the object side surface (number one) 1 of the first lens element 1111 is set as R1.

The radius of curvature of the center of the boundary surface (bonding surface) between the image surface side surface of the first lens element 1111 and the object side surface of the second lens element 1112 is set as R2.

The radius of curvature of the center of the boundary surface (bonding surface) between the image surface side surface of the second lens element 1112 and the object side surface of the third lens element 1113 is set as R3.

The radius of curvature of the center of the boundary surface (bonding surface) between the image surface side surface of the third lens element 1113 and the object side surface of the glass substrate 112B is set as R4.

The radius of curvature of the center of the boundary surface (bonding surface) between the image surface side surface of the glass substrate 112B and the object side surface of the second lens 113B is set as R5.

The radius of curvature of the center of the image surface side surface of the second lens 113B is set as R6. Incidentally, the radii of curvature R3, R4, and R5 of the centers of the surfaces 3, 4, and 5 are infinite (INFINITY).

In addition, as shown in FIG. 10, a distance on an optical axis OX between the surface 1 and the surface 2 as thickness of the first lens element 1111 is set as d1. A distance on the optical axis OX between the surface 2 and the surface 3 as thickness of the second lens element 1112 is set as d2.

A distance on the optical axis OX between the surface 3 and the surface 4 as thickness of the third lens element 1113 is set as d3.

A distance on the optical axis OX between the surface 4 and the surface 5 as thickness of the glass substrate 112B is set as d4.

A distance on the optical axis OX between the surface 5 and the surface 6 as thickness of the second lens 113B is set as d5. A distance on the optical axis OX between the image surface side surface of the second lens 113B and an image surface IMG is set as d6.

A third example based on concrete numerical values of the lens 110B of the imaging device 100B is shown in the following. Incidentally, in the third example, the surface numbers as shown in FIG. 10 are given to the lenses and the glass substrate of the lens 110B.

Third Example

The numerical values of the third example are shown in Table 9, Table 10, Table 11, and Table 12. The numerical values of the third example correspond to the lens 110B of FIG. 10.

The third example is a design example for a 5-megapixel (Mega pixel) CMOS imager having a ⅕ size and a 1.1-µm pitch.

As described above, the present third example includes an imaging element 120B curved so as to have a concave surface facing an object side and one group of lenses 110B.

The lenses 110B include the first lens 111B whose object side surface has a convex shape projecting to the object side, the glass substrate 112B provided with a diaphragm and an infrared cutoff filter, and the second lens 113B, with the first lens 111B, the glass substrate 112B, and the second lens 113B arranged in order from the object side to an image surface side without an air being interposed therebetween.

In this case, the first lens 111B is formed by the first lens element 1111 having an Abbe number of 57.3 and a positive power, the second lens element 1112 having an Abbe number of 29.6 and a negative power, and the third lens element 1113 having an Abbe number of 57.3 and a negative power.

The first lens 111B is desirably realized by providing a UV curing replica lens three times on the glass substrate 112B. The second lens 113B is desirably realized by providing a UV curing replica lens on the glass substrate 112B on the back side of the first lens 111B.

The first lens 111B can be formed on a D263T glass substrate from Schott by performing a replica process three times using an NT33 glass material manufactured by Nitto Denko Corporation, a 414C glass material manufactured by Asahi Kasei Corporation, and the NT33 manufactured by Nitto Denko Corporation in order, for example. Then, the second lens 113B can be formed on the back side of the first lens 111B by a replica process using the NT33 glass material manufactured by Nitto Denko Corporation.

As for a power arrangement, the first lens 111B has a strong positive power and a focal length of 5.0 mm, and the second lens 113B has a weak positive power and a focal length of 7.0 mm.

Figure 12:
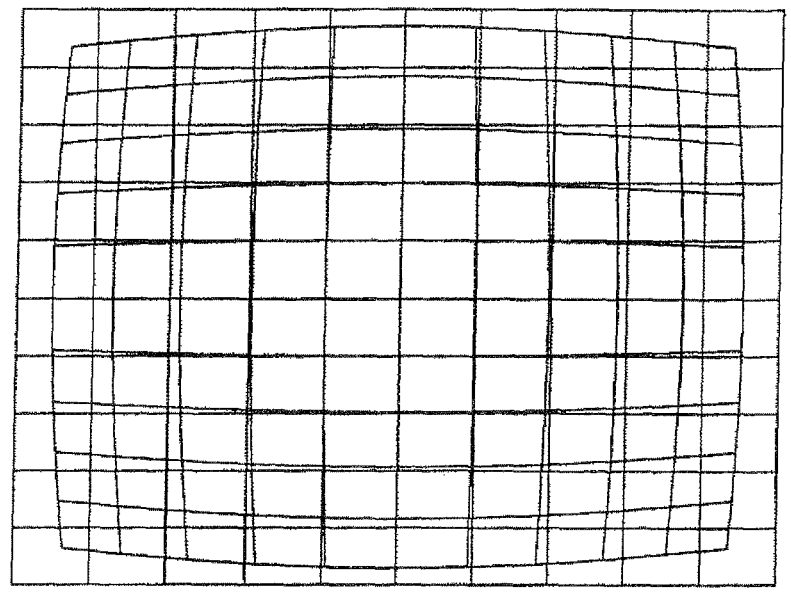
FIG. 12 is a diagram showing a distortion grid in the third example.

Though the imaging element 120B is a factor in generating large barrel optical distortion due to the curvature having a radius of 3.343 mm, there is a diaphragm between the first lens element 1111 and the second lens element 1112. Therefore, due to the effect of the above-described power arrangement, the lens generates a positive (pincushion) optical distortion of 25.5%, and as shown in FIG. 12, the TV distortion of the system is reduced to negative (barrel) 3.9%.

Figure 11:
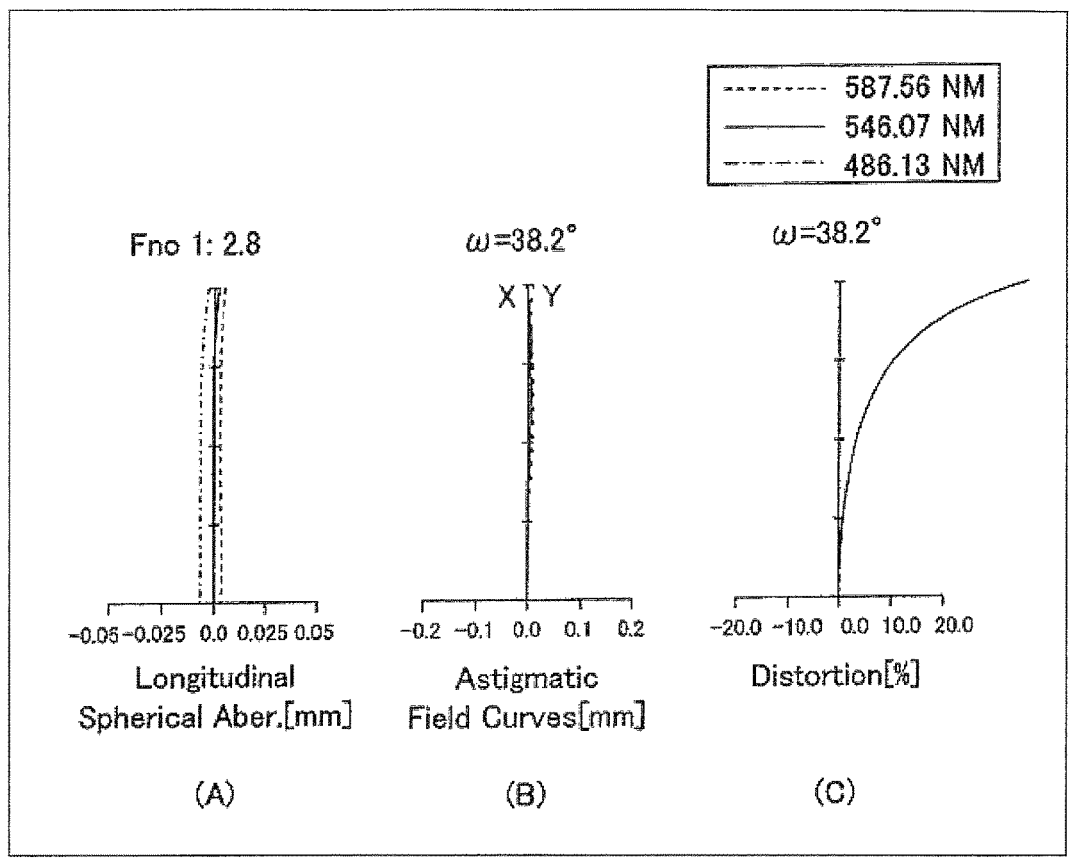
FIG. 11 is an aberration diagram showing spherical aberration (chromatic aberration), astigmatism, and distortion in a third example.

Then, a compact imaging system having a short optical total length of 3.60 mm is realized which corrects optical aberrations well, as shown in FIG. 11, while offering high brightness with an F-number Fno of 2.8 and having a wide angle, that is, a half angle of view of 38.2 degrees.

Table 9 shows the radii of curvature (R: mm), intervals (d: mm), refractive indices (nd), and dispersion values (vd) of the lenses and the glass substrate (transparent body) that correspond to the surface numbers of the lens 110B in the third example.

TABLE 9

Lens configuration data in the third example

| Surface number | R | d | nd | vd |
|---|---|---|---|---|
| 1: | 1.524 | 1.043 | 1.51 | 57.3 |
| 2: | −1.349 | 0.060 | 1.59 | 29.6 |
| 3: | −4.833 | 0.060 | 1.51 | 57.3 |
| 4: | INFINITY | 0.832 | 1.52 | 55.0 |
| 5: | INFINITY | 0.140 | 1.51 | 57.3 |
| 6: | −3.558 | 1.466 | | |
| IMG: | −3.343 | | | |

Table 10 shows the fourth-order, sixth-order, eighth-order, and tenth-order aspheric coefficients of the surface 1 of the first lens 111B and the surface 6 of the second lens 113B, which include an aspheric surface in the third example.

In Table 10, K represents a conic constant, A represents a fourth-order aspheric coefficient, B represents a sixth-order aspheric coefficient, C represents an eighth-order aspheric coefficient, and D represents a tenth-order aspheric coefficient.

TABLE 10

Aspheric surface data in the third example

| | | | | |
|---|---|---|---|---|
| First surface | K: 0.689 | A: −0.322E−01 | B: −0.336E−01 | C: 0.209E−01 | D: −0.230E−01 |
| Sixth surface | K: −0.811 | A: 0.797E−01 | B: −0.943E−02 | C: −0.441E−02 | D: 0.122E−01 |

Table 11 specifically shows the focal length f, numerical aperture F, half angle of view ω, and lens length H of the lens 110B in the third example.

In this case, the focal length f is set to 2.62 [mm], the numerical aperture F is set to 2.8, the half angle of view ω is set to 38.2 deg, and the lens length H is set to 3.60 [mm].

TABLE 11

Configuration data in the third example f (focal length) = 2.62 mm
F (numerical aperture) = 2.8
ω (half angle of view) = 38.2 deg
H (lens total length) = 3.60 mm Table 12 shows that each of the above-described conditional expressions (1) to (3) is satisfied in the third example.

TABLE 12

Values of conditional expressions in the third example
Conditional expression/third example

| (1) | 1.91 |
|---|---|
| (2) | 2.65 |
| (3) | −1.26 |

As shown in Table 12, in the third example, the power (fL1/f) of the first lens 111B is set to 1.91, which satisfies the condition defined by the conditional expression (1).

The power (fL2/f) of the second lens 113B is set to 2.65, which satisfies the condition on the positive side which condition is defined by the conditional expression (2). The radius of curvature (Ri) of the image surface IMG of the imaging element 120B is set to −1.26, which satisfies the condition defined by the conditional expression (3).

FIG. 11 is an aberration diagram showing spherical aberration (chromatic aberration), astigmatism, and distortion in the third example. (A) of FIG. 11 shows the spherical aberration (chromatic aberration), (B) of FIG. 11 shows the astigmatism, and (C) of FIG. 11 shows the distortion.

FIG. 12 is a diagram showing a distortion grid in the third example.

As is understood from the figures, according to the third example, an imaging device that excellently corrects spherical aberration, astigmatism, and distortion and includes a lens offering excellent image forming performance is obtained.

4. Fourth Embodiment

Figure 13:
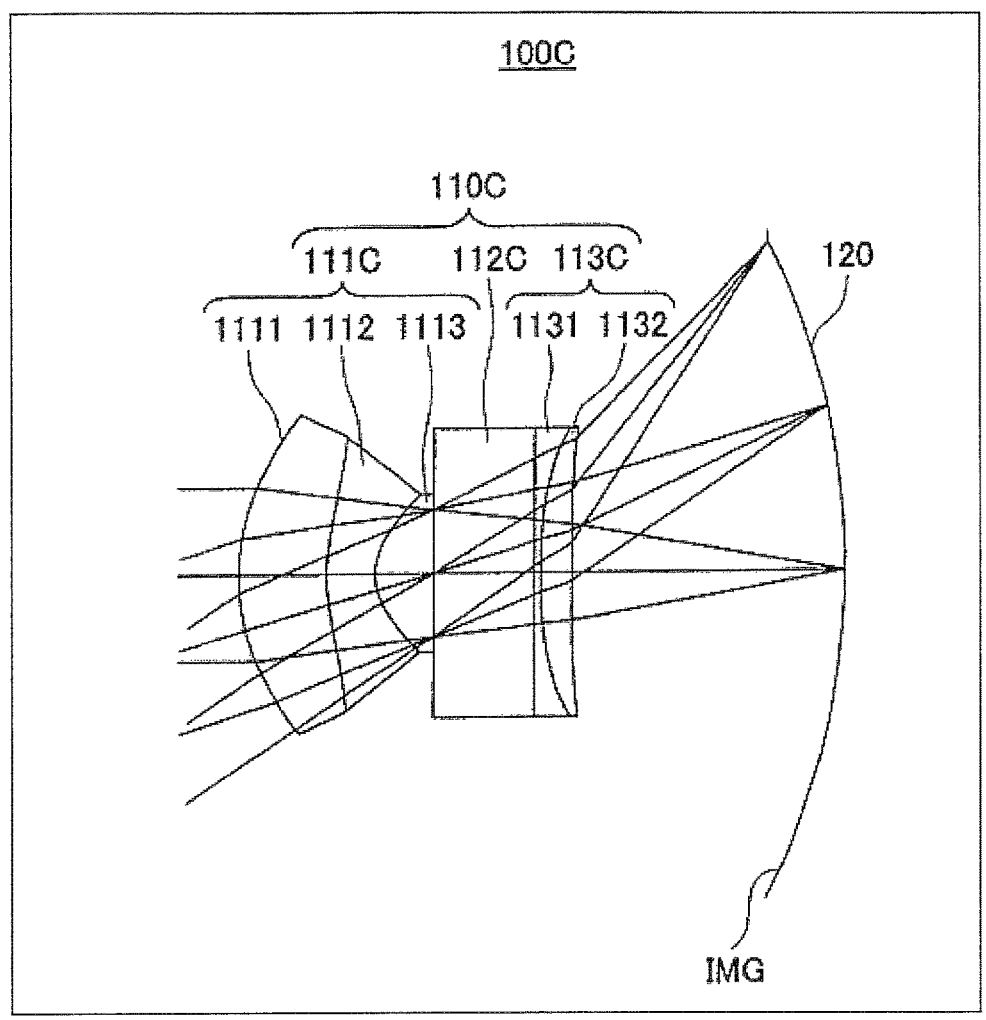
FIG. 13 is a diagram showing an example of configuration of an imaging device according to a present fourth embodiment.

FIG. 13 is a diagram showing an example of configuration of an imaging device according to a present fourth embodiment.

The imaging device 100C according to the fourth embodiment shown in FIG. 13 and the imaging device 100 according to the first embodiment shown in FIG. 1 are different from each other in the following respect.

In the imaging device 100C, a first lens 111C is formed by a first lens element 1111, a second lens element 1112, and a third lens element 1113.

In addition, a second lens 113C is formed by a fourth lens element 1131 and a fifth lens element 1132.

Figure 14:
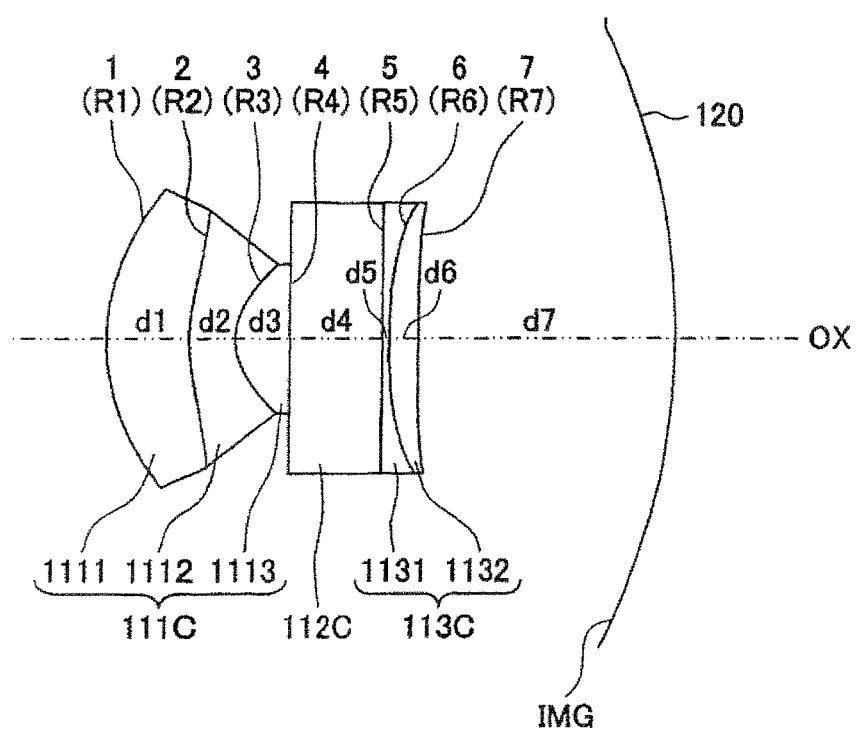
FIG. 14 is a diagram showing surface numbers given to lenses and a substrate forming each lens group of an imaging lens according to the present fourth embodiment and a cover glass forming an imaging portion.

FIG. 14 is a diagram showing surface numbers given to the lenses and the substrate of the imaging device 100C according to the present fourth embodiment.

Specifically, a surface number of number one is given to the object side surface (convex surface) of the first lens element 1111, and a surface number of number two is given to a boundary surface (bonding surface) between the image surface side surface of the first lens element 1111 and the object side surface of the second lens element 1112.

A surface number of number three is given to a boundary surface (bonding surface) between the image surface side surface of the second lens element 1112 and the object side surface of the third lens element 1113.

A surface number of number four is given to a boundary surface (bonding surface) between the image surface side surface of the third lens element 1113 and the object side surface of a glass substrate 112C.

A surface number of number five is given to a boundary surface (bonding surface) between the image surface side surface of the glass substrate 112C and the object side surface of the fourth lens element 1131.

A surface number of number six is given to a boundary surface (bonding surface) between the image surface side surface of the fourth lens element 1131 and the object side surface of the fifth lens element 1132, and a surface number of number seven is given to the image surface side surface of the fifth lens element 1132.

In addition, as shown in FIG. 14, in the lens 110C of the present embodiment, the radius of curvature of the center of the object side surface (number one) 1 of the first lens element 1111 is set as R1.

The radius of curvature of the center of the boundary surface (bonding surface) between the image surface side surface of the first lens element 1111 and the object side surface of the second lens element 1112 is set as R2.

The radius of curvature of the center of the boundary surface (bonding surface) between the image surface side surface of the second lens element 1112 and the object side surface of the third lens element 1113 is set as R3.

The radius of curvature of the center of the boundary surface (bonding surface) between the image surface side surface of the third lens element 1113 and the object side surface of the glass substrate 112C is set as R4.

The radius of curvature of the center of the boundary surface (bonding surface) between the image surface side surface of the glass substrate 112C and the object side surface of the fourth lens element 1131 is set as R5.

The radius of curvature of the center of the boundary surface (bonding surface) between the image surface side surface of the fourth lens element 1131 and the object side surface of the fifth lens element 1132 is set as R6.

The radius of curvature of the center of the image surface side surface of the fifth lens element 1132 is set as R7.

Incidentally, the radii of curvature R4 and R5 of the centers of the surfaces 4 and 5 are infinite (INFINITY).

In addition, as shown in FIG. 14, a distance on an optical axis OX between the surface 1 and the surface 2 as thickness of the first lens element 1111 is set as d1.

A distance on the optical axis OX between the surface 2 and the surface 3 as thickness of the second lens element 1112 is set as d2.

A distance on the optical axis OX between the surface 3 and the surface 4 as thickness of the third lens element 1113 is set as d3.

A distance on the optical axis OX between the surface 4 and the surface 5 as thickness of the glass substrate 112C is set as d4.

A distance on the optical axis OX between the surface 5 and the surface 6 as thickness of the fourth lens element 1131 is set as d5.

A distance on the optical axis OX between the surface 6 and the surface 7 as thickness of the fifth lens element 1132 is set as d6.

A distance on the optical axis OX between the image surface side surface of the fifth lens element 1132 and an image surface IMG is set as d7.

A fourth example based on concrete numerical values of the lens 110C of the imaging device 100C is shown in the following. Incidentally, in the fourth example, the surface numbers as shown in FIG. 14 are given to the lenses and the glass substrate of the lens 110C.

Fourth Example

The numerical values of the fourth example are shown in Table 13, Table 14, Table 15, and Table 16. The numerical values of the fourth example correspond to the lens 110C of FIG. 14.

The fourth example is a design example for an 8-megapixel (Mega pixel) CMOS imager having a ¼ size and a 1.1-μm pitch.

As described above, the present fourth example includes an imaging element 120C curved so as to have a concave surface facing an object side and one group of lenses 110C.

The lenses 110C include the first lens 111C whose object side surface has a convex shape projecting to the object side, the glass substrate 112C provided with a diaphragm and an infrared cutoff filter, and the second lens 113C, with the first lens 111C, the glass substrate 112C, and the second lens 113C arranged in order from the object side to an image surface side without an air being interposed therebetween.

In this case, the first lens 111C is formed by the first lens element 1111 having an Abbe number of 57.3 and a positive power, the second lens element 1112 having an Abbe number of 29.6 and a negative power, and the third lens element 1113 having an Abbe number of 57.3 and a negative power.

The second lens 113C is formed by the fourth lens element 1131 having an Abbe number of 57.3 and a negative power and the fifth lens element 1132 having an Abbe number of 29.6 and a positive power.

The first lens 111C is desirably realized by providing a UV curing replica lens three times on the glass substrate 112C. The second lens 113C is desirably realized by providing a UV curing replica lens twice on the glass substrate 112C on the back side of the first lens 111C.

The first lens 111C can be formed on a D263T glass substrate from Schott by performing a replica process three times using an NT33 glass material manufactured by Nitto Denko Corporation, a 414C glass material manufactured by Asahi Kasei Corporation, and the NT33 manufactured by Nitto Denko Corporation in order, for example. Then, the second lens 113C can be formed on the back side of the first lens 111C by a replica process using the NT33 glass material manufactured by Nitto Denko Corporation and the 414C manufactured by Asahi Kasei Corporation in order.

As for a power arrangement, the first lens 111C has a strong positive power and a focal length of 5.6 mm, and the second lens 113C has a weak positive power and a focal length of 40.5 mm.

Figure 16:
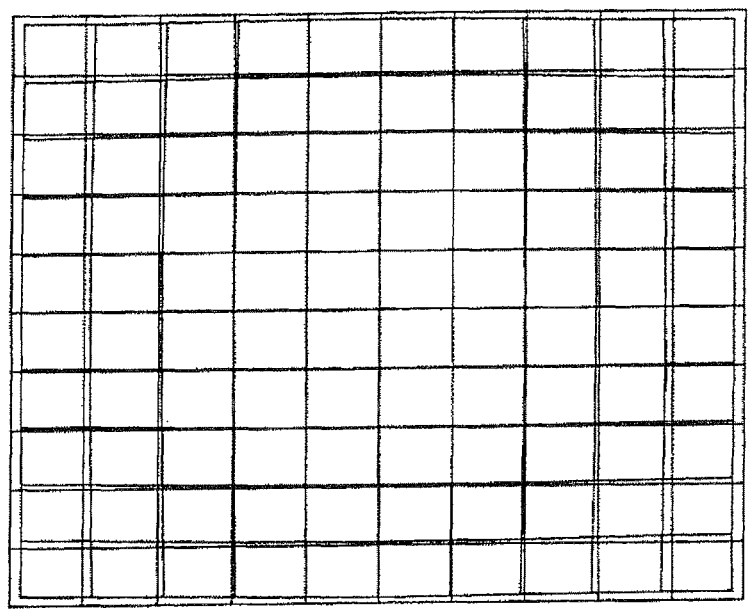
FIG. 16 is a diagram showing a distortion grid in the fourth example.

Though the imaging element 120C is a factor in generating large barrel optical distortion due to the curvature having a radius of 5.208 mm, there is a diaphragm between the first lens element 1111 and the second lens element 1112. Therefore, due to the effect of the above-described power arrangement, the lens generates a positive (pincushion) optical distortion of 35.8%, and as shown in FIG. 16, the TV distortion of the system is reduced to negative (barrel) 0.6%.

Figure 15:
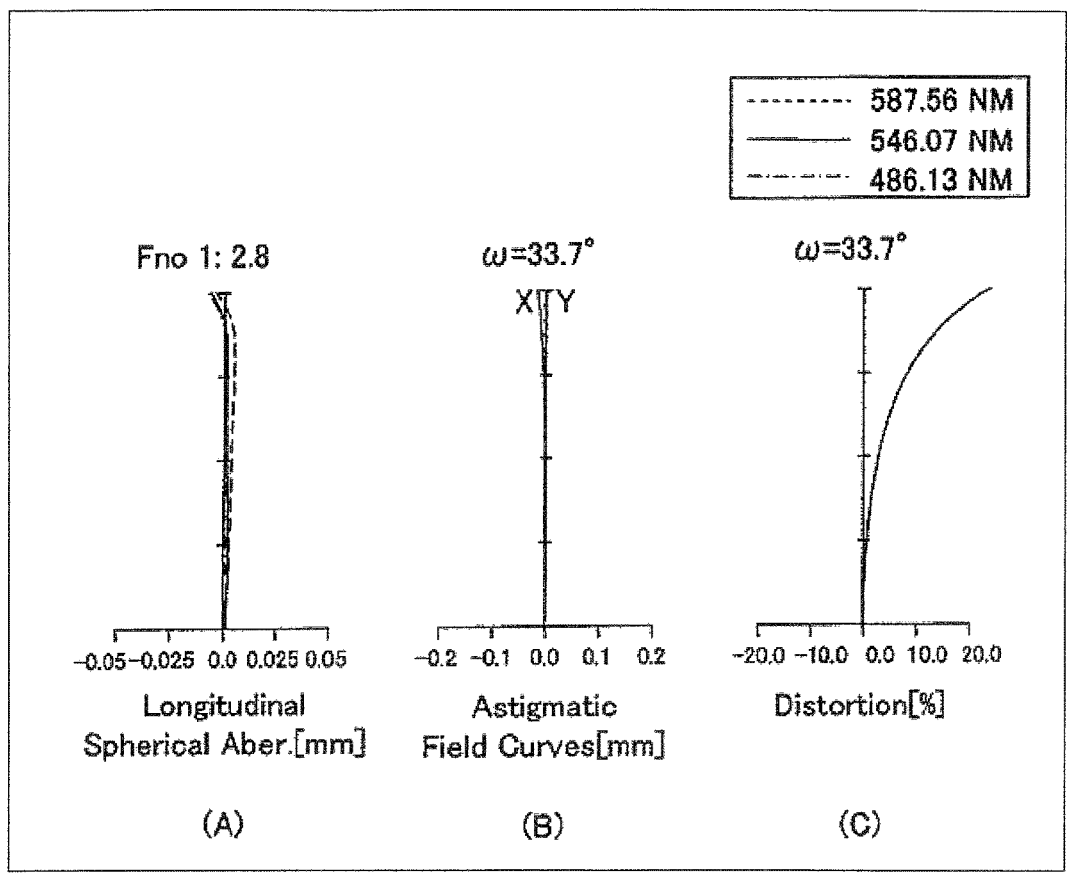
FIG. 15 is an aberration diagram showing spherical aberration (chromatic aberration), astigmatism, and distortion in a fourth example.

Then, a compact imaging system having a short optical total length of 4.20 mm is realized which corrects optical aberrations well, as shown in FIG. 15, while offering high brightness with an F-number Fno of 2.8 and having a wide angle, that is, a half angle of view of 33.7 degrees.

Table 13 shows the radii of curvature (R: mm), intervals (d: mm), refractive indices (nd), and dispersion values (vd) of the lenses and the glass substrate (transparent body) that correspond to the surface numbers of the lens 110C in the fourth example.

TABLE 13

Lens configuration data in the fourth example

| Surface number | R | d | nd | vd |
|---|---|---|---|---|
| 1: | 1.545 | 0.596 | 1.51 | 57.3 |
| 2: | 1.387 | 0.335 | 1.59 | 29.6 |
| 3: | 0.445 | 0.398 | 1.53 | 43.4 |
| 4: | INFINITY | 0.700 | 1.47 | 65.4 |
| 5: | INFINITY | 0.050 | 1.51 | 57.3 |
| 6: | 8.627 | 0.214 | 1.59 | 29.6 |
| 7: | −39.87 | 2.122 | | |
| IMG: | −5.028 | | | |

Table 14 shows the fourth-order, sixth-order, eighth-order, and tenth-order aspheric coefficients of the surface 1, the surface 2, and the surface 3 of the first lens 111C and the surface 6 and the surface 7 of the second lens 113C, which include an aspheric surface in the fourth example.

In Table 14, K represents a conic constant, A represents a fourth-order aspheric coefficient, B represents a sixth-order aspheric coefficient, C represents an eighth-order aspheric coefficient, and D represents a tenth-order aspheric coefficient.

TABLE 14

Aspheric surface data in the fourth example

| | | | | | |
|---|---|---|---|---|---|
| First surface | K: 0.284 | A: −0.173E−01 | B: −0.163E−01 | C: −0.542E−02 | D: −0.301E−02 |
| Second surface | K: −0.377 | A: −0.635E+00 | B: 0.915E+00 | C: −0.753E+00 | D: 0.209E+00 |
| Third surface | K: −0.570 | A: −0.114E+01 | B: −0.380E+00 | C: 0.479E+01 | D: −0.186E+02 |
| Sixth surface | K: −1.000 | A: 0.336E+00 | B: −0.453E+00 | C: 0.309E+00 | D: −0.501E−01 |
| Seventh surface | K: 1.000 | A: 0.903E−01 | B: −0.457E−01 | C: 0.328E−02 | D: 0.900E−02 |

Table 15 specifically shows the focal length f, numerical aperture F, half angle of view ω, and lens length H of the lens 110C in the fourth example.

In this case, the focal length f is set to 3.48 [mm], the numerical aperture F is set to 2.8, the half angle of view ω is set to 33.7 deg, and the lens length H is set to 4.20 [mm].

TABLE 15

Configuration data in the fourth example f (focal length) = 3.48 mm
F (numerical aperture) = 2.8

TABLE 15-continued

Configuration data in the fourth example

ω (half angle of view) = 33.7 deg
H (lens total length) = 4.20 mm

Table 16 shows that each of the above-described conditional expressions (1) to (3) is satisfied in the fourth example.

TABLE 16

Values of conditional expressions in the fourth example
Conditional expression/fourth example

| (1) | 1.61 |
|---|---|
| (2) | 11.64 |
| (3) | −1.44 |

As shown in Table 16, in the fourth example, the power (fL1/f) of the first lens 111C is set to 1.61, which satisfies the condition defined by the conditional expression (1).

The power (fL2/f) of the second lens 113C is set to 11.64, which satisfies the condition on the positive side which condition is defined by the conditional expression (2).

The radius of curvature (Ri) of the image surface IMG of the imaging element 120C is set to −1.44, which satisfies the condition defined by the conditional expression (3).

FIG. 15 is an aberration diagram showing spherical aberration (chromatic aberration), astigmatism, and distortion in the fourth example. (A) of FIG. 15 shows the spherical aberration (chromatic aberration), (B) of FIG. 15 shows the astigmatism, and (C) of FIG. 15 shows the distortion.

FIG. 16 is a diagram showing a distortion grid in the fourth example.

As is understood from the figures, according to the fourth example, an imaging device that excellently corrects spherical aberration, astigmatism, and distortion and includes a lens offering excellent image forming performance is obtained.

5. Fifth Embodiment

Figure 17:
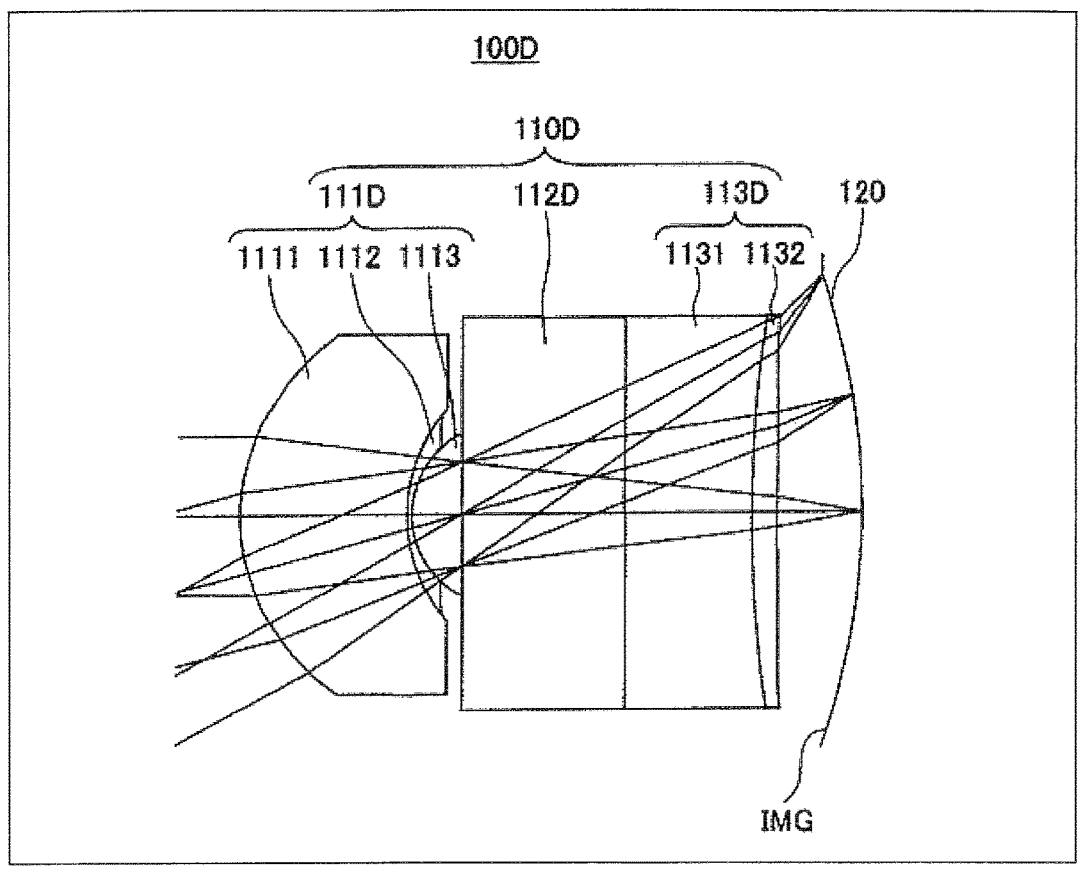
FIG. 17 is a diagram showing an example of configuration of an imaging device according to a present fifth embodiment.

FIG. 17 is a diagram showing an example of configuration of an imaging device according to a present fifth embodiment.

The imaging device 100D according to the fifth embodiment shown in FIG. 17 and the imaging device 100 according to the first embodiment shown in FIG. 1 are different from each other in the following respect.

In the imaging device 100D, a first lens 111D is formed by a first lens element 1111, a second lens element 1112, and a third lens element 1113.

In addition, a second lens 113D is formed by a fourth lens element 1131 and a fifth lens element 1132.

Figure 18:
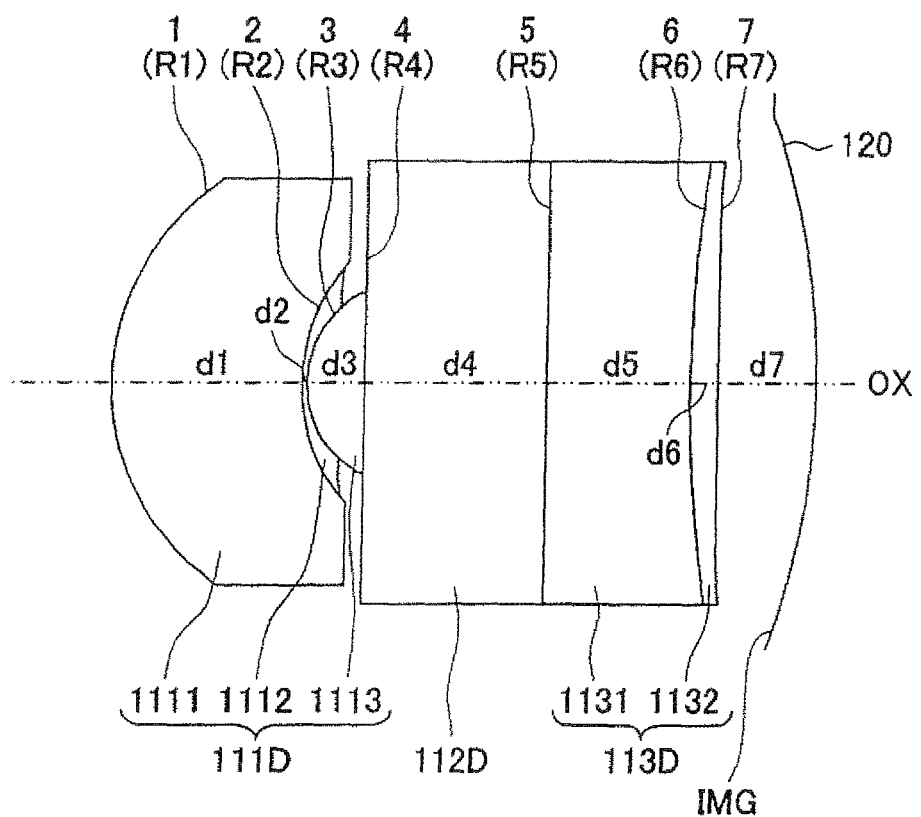
FIG. 18 is a diagram showing surface numbers given to lenses and a substrate forming each lens group of an imaging lens according to the present fifth embodiment and a cover glass forming an imaging portion.

FIG. 18 is a diagram showing surface numbers given to the lenses and the substrate of the imaging device 100D according to the present fifth embodiment.

Specifically, a surface number of number one is given to the object side surface (convex surface) of the first lens element 1111, and a surface number of number two is given to a boundary surface (bonding surface) between the image surface side surface of the first lens element 1111 and the object side surface of the second lens element 1112.

A surface number of number three is given to a boundary surface (bonding surface) between the image surface side surface of the second lens element 1112 and the object side surface of the third lens element 1113.

A surface number of number four is given to a boundary surface (bonding surface) between the image surface side surface of the third lens element 1113 and the object side surface of a glass substrate 112D.

A surface number of number five is given to a boundary surface (bonding surface) between the image surface side surface of the glass substrate 112D and the object side surface of the fourth lens element 1131.

A surface number of number six is given to a boundary surface (bonding surface) between the image surface side surface of the fourth lens element 1131 and the object side surface of the fifth lens element 1132, and a surface number of number seven is given to the image surface side surface of the fifth lens element 1132.

In addition, as shown in FIG. 18, in the lens 111D of the present embodiment, the radius of curvature of the center of the object side surface (number one) 1 of the first lens element 1111 is set as R1.

The radius of curvature of the center of the boundary surface (bonding surface) between the image surface side surface of the first lens element 1111 and the object side surface of the second lens element 1112 is set as R2.

The radius of curvature of the center of the boundary surface (bonding surface) between the image surface side surface of the second lens element 1112 and the object side surface of the third lens element 1113 is set as R3.

The radius of curvature of the center of the boundary surface (bonding surface) between the image surface side surface of the third lens element 1113 and the object side surface of the glass substrate 112D is set as R4.

The radius of curvature of the center of the boundary surface (bonding surface) between the image surface side surface of the glass substrate 112D and the object side surface of the fourth lens element 1131 is set as R5.

The radius of curvature of the center of the boundary surface (bonding surface) between the image surface side surface of the fourth lens element 1131 and the object side surface of the fifth lens element 1132 is set as R6.

The radius of curvature of the center of the image surface side surface of the fifth lens element 1132 is set as R7.

Incidentally, the radii of curvature R4 and R5 of the centers of the surfaces 4 and 5 are infinite (INFINITY).

In addition, as shown in FIG. 18, a distance on an optical axis OX between the surface 1 and the surface 2 as thickness of the first lens element 1111 is set as d1.

A distance on the optical axis OX between the surface 2 and the surface 3 as thickness of the second lens element 1112 is set as d2.

A distance on the optical axis OX between the surface 3 and the surface 4 as thickness of the third lens element 1113 is set as d3.

A distance on the optical axis OX between the surface 4 and the surface 5 as thickness of the glass substrate 112D is set as d4.

A distance on the optical axis OX between the surface 5 and the surface 6 as thickness of the fourth lens element 1131 is set as d5.

A distance on the optical axis OX between the surface 6 and the surface 7 as thickness of the fifth lens element 1132 is set as d6.

A distance on the optical axis OX between the image surface side surface of the fifth lens element 1132 and an image surface IMG is set as d7.

A fifth example based on concrete numerical values of the lens 110D of the imaging device 100D is shown in the following. Incidentally, in the fifth example, the surface numbers as shown in FIG. 18 are given to the lenses and the glass substrate of the lens 110D.

Fifth Example

The numerical values of the fifth example are shown in Table 17, Table 18, Table 19, and Table 20. The numerical values of the fifth example correspond to the lens 110D of FIG. 18.

The fifth example is a design example for an 8-megapixel (Mega pixel) CMOS imager having a ¼ size and a 1.1-μm pitch.

As described above, the present fifth example includes an imaging element 120D curved so as to have a concave surface facing an object side and one group of lenses 110D.

The lenses 110D are formed by the first lens 111D whose object side surface has a convex shape projecting to the object side, the glass substrate 112D provided with a diaphragm and an infrared cutoff filter, and the second lens 113D, with the first lens 111D, the glass substrate 112D, and the second lens 113D arranged in order from the object side to an image surface side without an air being interposed therebetween.

In this case, the first lens 111D is formed by the first lens element 1111 having an Abbe number of 57.3 and a positive power, the second lens element 1112 having an Abbe number of 29.6 and a negative power, and the third lens element 1113 having an Abbe number of 57.3 and a negative power.

The second lens 113D is formed by the fourth lens element 1131 having an Abbe number of 57.3 and a negative power and the fifth lens element 1132 having an Abbe number of 29.6 and a positive power.

The first lens 111D is desirably realized by providing a UV curing replica lens three times on the glass substrate 112D. The second lens 113D is desirably realized by providing a UV curing replica lens twice on the glass substrate 112D on the back side of the first lens 111D. The first lens 111D can be formed on a D263T glass substrate from Schott by performing a replica process three times using an NT33 glass material manufactured by Nitto Denko Corporation, a 414C glass material manufactured by Asahi Kasei Corporation, and the NT33 manufactured by Nitto Denko Corporation in order, for example. Then, the second lens 113D can be formed on the back side of the first lens 111D by a replica process using the NT33 glass material manufactured by Nitto Denko Corporation and the 414C manufactured by Asahi Kasei Corporation in order.

As for a power arrangement, the first lens 111D has a strong positive power and a focal length of 8.18 mm, and the second lens 113D has a weak negative power and a focal length of −647.8 mm.

Figure 20:
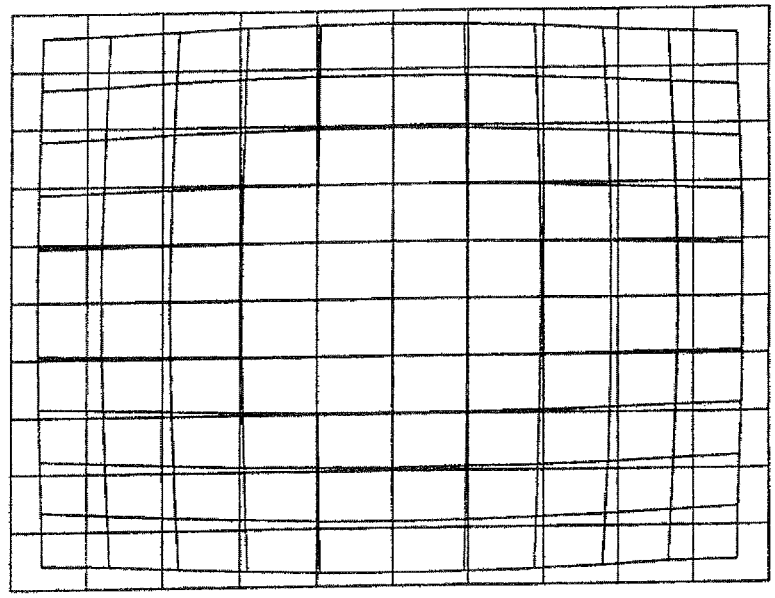
FIG. 20 is a diagram showing a distortion grid in the fifth example.

Though the imaging element 120D is a factor in generating large barrel optical distortion due to the curvature having a radius of 8.5 mm, there is a diaphragm between the first lens element 1111 and the second lens element 1112. Therefore, due to the effect of the above-described power arrangement, the lens generates a positive (pincushion) optical distortion of 13.9%, and as shown in FIG. 20, the TV distortion of the system is reduced to negative (barrel) 1.9%.

Figure 19:
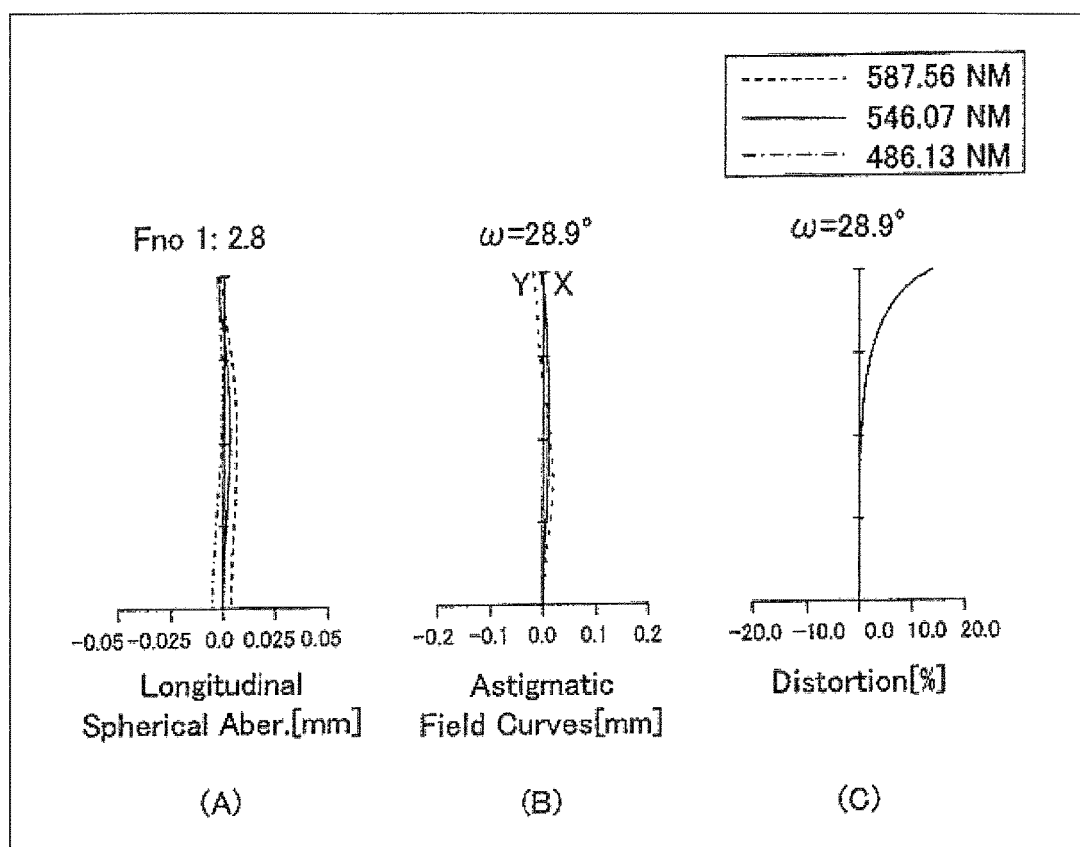
FIG. 19 is an aberration diagram showing spherical aberration (chromatic aberration), astigmatism, and distortion in a fifth example.

Then, a compact imaging system having a short optical total length of 7.64 mm is realized which corrects optical aberrations well, as shown in FIG. 19, while offering high brightness with an F-number Fno of 2.8 and having a wide angle, that is, a half angle of view of 28.9 degrees.

Table 17 shows the radii of curvature (R: mm), intervals (d: mm), refractive indices (nd), and dispersion values (vd) of the lenses and the glass substrate (transparent body) that correspond to the surface numbers of the lens 110D in the fifth example.

TABLE 17

Lens configuration data in the fifth example

| Surface number | R | d | nd | vd |
| --- | --- | --- | --- | --- |
| 1: | 2.522 | 2.026 | 1.51 | 57.3 |
| 2: | 1.967 | 0.060 | 1.59 | 29.6 |
| 3: | 1.116 | 0.621 | 1.51 | 57.3 |
| 4: | INFINITY | 2.000 | 1.47 | 65.4 |
| 5: | INFINITY | 1.568 | 1.51 | 57.3 |
| 6: | 16.24 | 0.304 | 1.59 | 29.6 |
| 7: | 88.60 | 2.063 | | |
| IMG: | −8.500 | 0.000 | | |

Table 18 shows the fourth-order, sixth-order, eighth-order, and tenth-order aspheric coefficients of the surface 1 of the first lens 111D and the surface 7 of the second lens 113D, which include an aspheric surface in the fifth example.

In Table 18, K represents a conic constant, A represents a fourth-order aspheric coefficient, B represents a sixth-order aspheric coefficient, C represents an eighth-order aspheric coefficient, and D represents a tenth-order aspheric coefficient.

TABLE 18

Aspheric surface data in the fifth example

| First surface | K: −0.826 | A: 0.384E−02 | B: 0.112E−02 | C: −0.193E−03 | D: 0.238E−04 |
| --- | --- | --- | --- | --- | --- |
| Seventh surface | K: 1.000 | A: −0.362E−02 | B: 0.940E−03 | C: −0.855E−04 | D: 0.654E−05 |

Table 19 specifically shows the focal length f, numerical aperture F, half angle of view ω, and lens length H of the lens 110D in the fifth example.

In this case, the focal length f is set to 5.56 [mm], the numerical aperture F is set to 2.8, the half angle of view ω is set to 28.9 deg, and the lens length H is set to 7.64 [mm].

TABLE 19

Configuration data in the fifth example f (focal length) = 5.56 mm
F (numerical aperture) = 2.8
ω (half angle of view) = 28.9 deg
H (lens total length) = 7.64 mm Table 20 shows that each of the above-described conditional expressions (1) to (3) is satisfied in the fifth example.

TABLE 20

Values of conditional expressions in the fifth example
Conditional expression/fifth example

| (1) | 1.47 |
| --- | --- |
| (2) | −116.5 |
| (3) | −1.53 |

As shown in Table 20, in the fifth example, the power (fL1/f) of the first lens 111D is set to 1.47, which satisfies the condition defined by the conditional expression (1).

The power (fL2/f) of the second lens 113D is set to −116.5, which satisfies the condition on the negative side which condition is defined by the conditional expression (2).

The radius of curvature (Ri) of the image surface IMG of the imaging element 120D is set to −1.53, which satisfies the condition defined by the conditional expression (3).

FIG. 19 is an aberration diagram showing spherical aberration (chromatic aberration), astigmatism, and distortion in the fifth example. (A) of FIG. 19 shows the spherical aberration (chromatic aberration), (B) of FIG. 19 shows the astigmatism, and (C) of FIG. 19 shows the distortion.

FIG. 20 is a diagram showing a distortion grid in the fifth example.

As is understood from the figures, according to the fifth example, an imaging device that excellently corrects spherical aberration, astigmatism, and distortion and includes a lens offering excellent image forming performance is obtained.

The above description has been made by taking, as the first to fifth embodiments, examples in which an imaging element is curved so as to have a concave surface facing the object side, and formed by one group of lenses, which lenses are formed without an air being interposed therebetween from the object side to the image surface side.

Description in the following will be made by taking, as a sixth to a tenth embodiment, examples in which an imaging element is curved so as to have a concave surface facing the object side, and formed by two groups of lenses or more groups of lenses.

6. Sixth Embodiment

Figure 21:
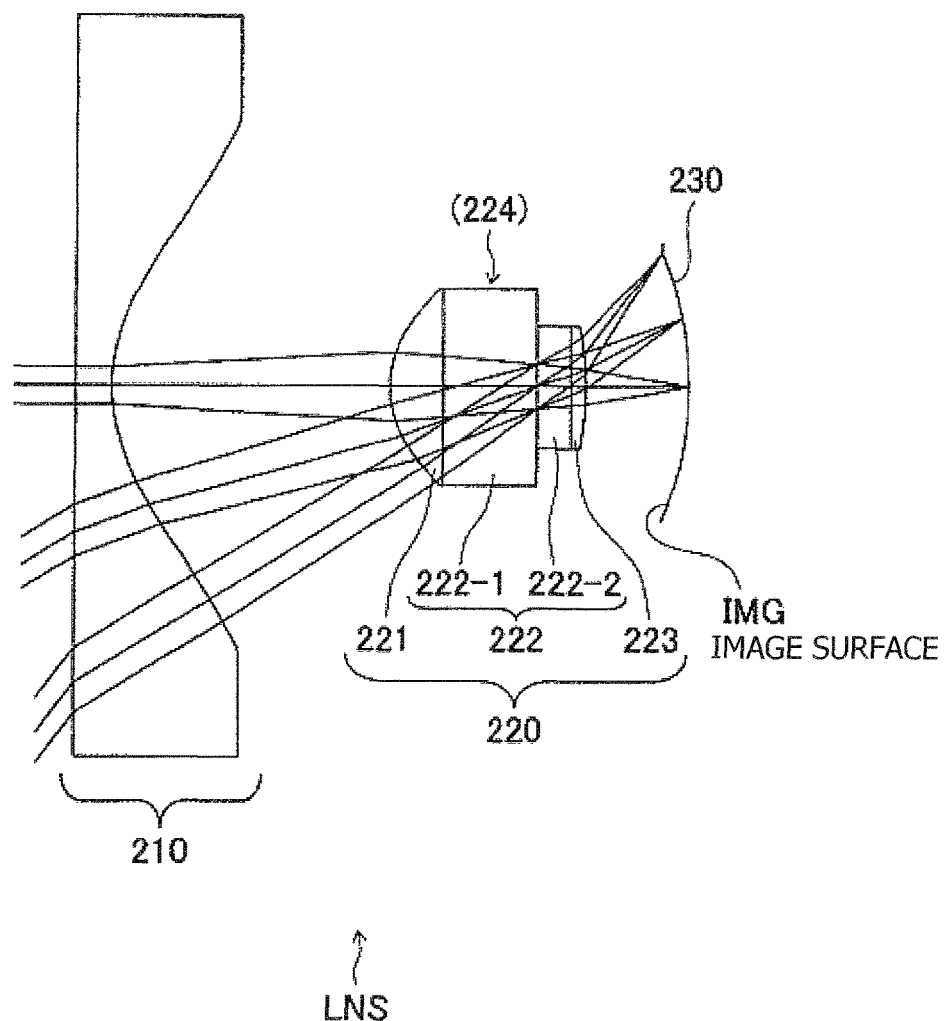
FIG. 21 is a diagram showing an example of configuration of an imaging device according to a present sixth embodiment.

FIG. 21 is a diagram showing an example of configuration of an imaging device according to a present sixth embodiment.

The imaging device 200 according to the sixth embodiment shown in FIG. 21 basically includes two groups of lenses LNS, which are a first lens group 210 and a second lens group 220 arranged in order from an object side OBJS to an image surface side, and an imaging element 230 curved so as to have a concave surface facing the object side.

Thus, the imaging device 200 includes the imaging element 230 curved with the concave surface facing the object side and the two groups of lenses LNS.

The lenses LNS include the first lens group 210 and the second lens group 220, which are arranged in order from the object side to the image surface side.

The second lens group 220 includes a first lens 221 whose object side surface has a convex shape projecting to the object side, a transparent body 222 (222-1 and 222-2), and a second lens 223, with the first lens 221, the transparent body 222, and the second lens 223 arranged in order without an air being interposed therebetween.

The transparent body 222 is desirably formed by a glass substrate, and is desirably provided with a diaphragm and an infrared cutoff filter.

The first lens group 210 is formed by a negative-power lens using an aspheric surface. The second lens group 220 is formed as follows.

The first lens 221 of the second lens group 220 has a strong positive power, and is desirably realized by providing a UV curing replica lens on the glass substrate. In addition, a doublet configuration can be adopted by providing a different replica glass material twice, or a triplet configuration can be adopted by providing a different replica glass material three times, to improve performance. Configurations more than the triplet configuration are also possible.

The second lens 223 of the second lens group 220 has a weak positive or negative power, and is desirably realized by providing a UV curing replica lens on the glass substrate on the back side of the first lens 221. In addition, a doublet configuration may be adopted by providing a different replica glass material twice, or a triplet configuration or more may be adopted by providing a different replica glass material three times or more.

There is a diaphragm 224 between the first lens 221 and the second lens 223 of the second lens group 220. Therefore, negative (barrel) optical distortion generated by curving the imaging element 230 is cancelled out by generating strong positive (pincushion) optical distortion in the lens groups due to effect of the above-described power arrangement, so that desirable optical distortion is realized on the imaging element as a whole. Incidentally, the optical distortion of the lens group is positive 4% or more.

As in the first embodiment and the like, the single focus lens assumes that an imaging surface (image receiving surface) of a solid-state imaging element such as a CCD sensor, a CMOS sensor, or the like is disposed as an image forming surface IMG.

In addition, not only a cover glass formed of resin or glass, an infrared cutoff filter, a low-pass filter, and the like but also an optical member may be disposed between a last surface on the image side and the image forming surface or in front of a first surface on the object side.

Incidentally, in the present embodiment, in FIG. 21, a left side is the object side (front), and a right side is the image surface side (rear).

In addition, a light flux incident from the object side forms an image on the image surface IMG of the imaging element 230.

The configuration and effect of the imaging lens according to the present embodiment will be described in the following.

The imaging lens according to the present embodiment as a single focus lens is configured to satisfy the following conditional expressions (1) to (3).

The conditional expression (1) defines a condition related to the power of the first lens group 210.

$$-10 \leq fG1/f \leq -1.0 \tag{1}$$

where fG1 denotes the focal length of the first lens group 210, and f denotes the focal length of the lens system.

The conditional expression (1) is necessary for the following reasons.

When the upper limit is exceeded, the power becomes too strong, and an actually attainable assembly accuracy is not achieved. The conditional expression (1) is therefore necessary.

When the lower limit is exceeded, the negative power becomes too weak, and advantages of providing the negative power with the first lens group 210 are not obtained. That is, when the lower limit is exceeded, effects of decreasing an angle of incidence of a chief ray on the imaging element by bringing an apparent exit pupil position to the front, being able to obtain a long back focus, and preventing deterioration in amount of peripheral light, for example, are weakened, and sufficient optical characteristics cannot be obtained. The conditional expression (1) is therefore necessary.

The conditional expression (2) defines a condition related to the power of the second lens group 220.

$$0.8 \leq fG2/f \leq 5.0 \tag{2}$$

where fG2 denotes the focal length of the second lens group 220, and f denotes the focal length of the lens system.

The conditional expression (2) is necessary for the following reasons.

When the upper limit is exceeded, positive (pincushion) optical distortion is not produced, and the system becomes unusable. The conditional expression (2) is therefore necessary.

When the lower limit is exceeded, the power becomes too strong, and an actually attainable assembly accuracy is not achieved. The conditional expression (2) is therefore necessary.

The conditional expression (3) defines a condition related to the curvature of the imaging element 120.

$$-40 \leq Ri/f \leq -0.6 \tag{3}$$

where Ri denotes the radius of curvature of the image surface IMG.

The conditional expression (3) is necessary for the following reasons.

When the upper limit is exceeded, field curvature cannot be completely corrected by the lens, and an MTF is degraded as the image height is increased. The conditional expression (3) is therefore necessary. When the lower limit is exceeded, the field curvature is corrected excessively, the MTF is degraded as the image height is increased, and it is difficult to achieve the curvature in manufacturing. The conditional expression (3) is therefore necessary.

The above conditional expressions (1) to (3) are common to a sixth to a ninth example to be dealt with in the following, and are used appropriately as required to realize more desirable image forming performance and a compact optical system suitable for each individual imaging element or imaging device.

As described above, assuming that a direction from the object side to the image surface side is positive, k is a conic constant, A, B, C and D are aspheric coefficients, and r is the radius of curvature of a center, the shape of the aspheric surface of a lens is expressed by the above-described Math. 1. y represents the height of light from an optical axis, and c represents the inverse (1/r) of the radius of curvature r of the center.

X represents a distance from a tangent plane with respect to the vertex of the aspheric surface, A represents a fourth-order aspheric coefficient, B represents a sixth-order aspheric coefficient, C represents an eighth-order aspheric coefficient, and D represents a tenth-order aspheric coefficient.

Figure 22:
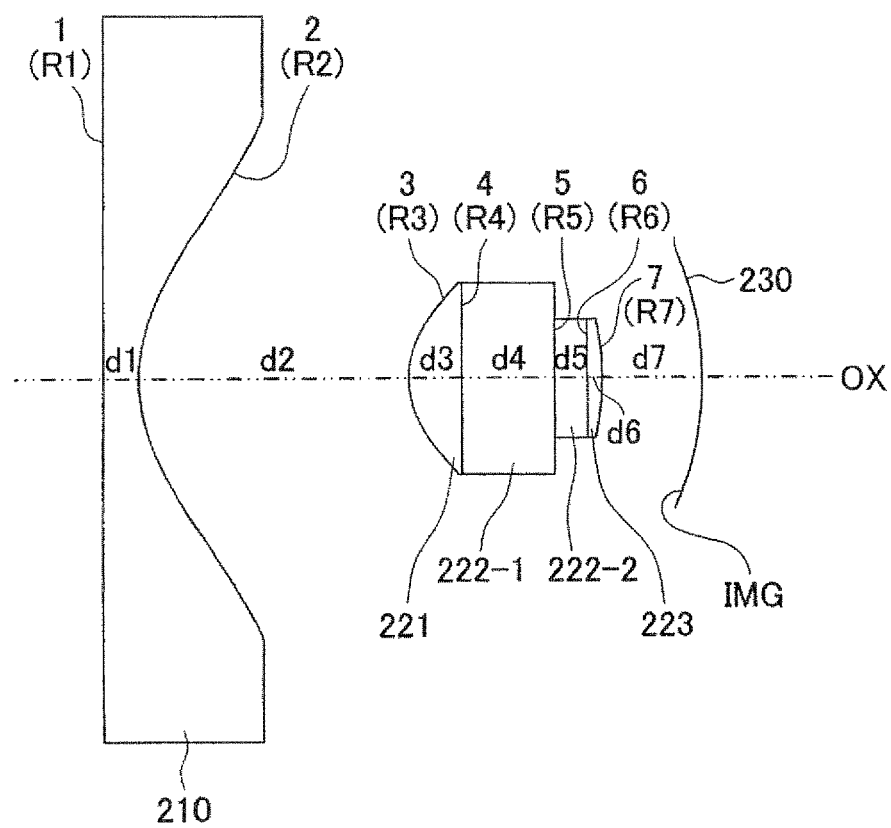
FIG. 22 is a diagram showing surface numbers given to the lenses and the substrate of the imaging device according to the present first embodiment.

FIG. 22 is a diagram showing surface numbers given to the lenses and the substrate of the imaging device according to the present first embodiment.

Specifically, a surface number of number one is given to the object side surface of the first lens group 210, and a surface number of number two is given to the image surface side surface of the first lens group 210.

A surface number of number three is given to the object side (convex surface) surface of the first lens 221 of the second lens group 220, and a surface number of number four is given to a boundary surface (bonding surface) between the image surface side surface of the first lens 221 and the object side surface of the transparent body 222-1.

A surface number of number five is given to a boundary surface (bonding surface) between the image surface side surface of the transparent body 222-1 and the object side surface of the transparent body 222-2, and a surface number of number six is given to a boundary surface (bonding surface) between the image surface side surface of the transparent body 222-2 and the object side surface of the second lens 223.

In addition, a surface number of number seven is given to the image surface side surface of the second lens 223.

In addition, as shown in FIG. 22, in the imaging device 200 of the present embodiment, the radius of curvature of the center of the object side surface (number one) 1 of the first lens group 210 is set as R1.

The radius of curvature of the center of the image surface side surface 2 of the first lens group 210 is set as R2.

The radius of curvature of the center of the object side (convex surface) surface 3 of the first lens 221 of the second lens group 220 is set as R3, and the radius of curvature of the center of the boundary surface (bonding surface) 4 between the image surface side surface of the first lens 221 and the object side surface of the transparent body 222-1 is set as R4.

The radius of curvature of the center of the boundary surface (bonding surface) 5 between the image surface side surface of the transparent body 222-1 and the object side surface of the transparent body 222-2 is set as R5, and the radius of curvature of the center of the image surface side surface of the transparent body 222-2 and the object side surface 6 of the second lens 223 is set as R6.

In addition, the radius of curvature of the center of the image surface side surface 7 of the second lens 223 is set as R7.

Incidentally, the radii of curvature R4, R5, and R6 of the centers of the surfaces 4, 5, and 6 are infinite (INFINITY).

In addition, as shown in FIG. 22, a distance on the optical axis OX between the surface 1 and the surface 2 as thickness of the first lens group 210 is set as d1, and a distance on the optical axis OX between the image surface side surface 2 of the first lens group 210 and the object side surface 3 of the first lens 221 of the second lens group 220 is set as d2.

A distance on the optical axis OX between the surface 3 and the surface 4 as thickness of the first lens 221 is set as d3.

A distance on the optical axis OX between the surface 4 and the surface 5 as thickness of the transparent body 222-1 is set as d4.

A distance on the optical axis OX between the surface 5 and the surface 6 as thickness of the transparent body 222-2 is set as d5.

A distance on the optical axis OX between the surface 6 and the surface 7 as thickness of the second lens 223 is set as d6, and a distance on the optical axis OX between the image surface side surface of the second lens 223 and the image surface IMG is set as d7.

A sixth example based on concrete numerical values of the lenses of the imaging device 200 is shown in the following. Incidentally, in the sixth example, the surface numbers as shown in FIG. 22 are given to the lenses and the transparent body.

Sixth Example

The numerical values of the sixth example are shown in Table 21, Table 22, and Table 23. The numerical values of the sixth example correspond to FIG. 21.

The sixth example is a design example of a vehicle-mounted camera, a PC camera, a surveillance camera, or the like for a 1.3-M CMOS imager having a ¼ size and a 2.8-µm pitch.

The imaging device 200 includes the imaging element 230 curved so as to have a concave surface facing the object side and two groups of lenses. As for the lenses, the first lens group 210 is formed by an aspheric lens having a negative power. A material such as a glass mold, plastic, a casting type lens, or the like is suitable for the aspheric lens.

The second lens group 220 includes the first lens 221 whose object side surface has a convex shape projecting to the object side, the glass substrate (transparent body) 222 provided with a diaphragm and an infrared cutoff filter, and the second lens 223 having a weak power, with the first lens 221, the transparent body 222, and the second lens 223 arranged in order from the object side to the image surface side without an air being interposed therebetween.

The first lens 221 is desirably realized by providing a UV curing replica lens on the diaphragm or on an opposite surface from the diaphragm on the glass substrate provided with the infrared cutoff filter.

In addition, the second lens 223 is desirably realized by providing a UV curing replica lens on the glass substrate. In this case, the second lens 223 may be provided on the back of the first lens 221, or the first lens 221 and the second lens 223 may be provided on separate glass substrates and the glass substrates may be laminated to each other.

The first lens 221 and the second lens 223 can be formed on a D263T glass substrate from Schott by a replica process using an NT33 glass material from Nitto Denko Corporation, for example.

As for a power arrangement, the first lens group 210 has a strong negative power and a focal length of −5.52 mm, and the second lens group 220 has a weak positive power and a focal length of 2.67 mm.

Because the optical system has a focal length of 1.80 mm, −3.07 is obtained for the conditional expression (1), and 1.48 is obtained for the conditional expression (2), so that the requirements of the conditional expressions are satisfied.

Figure 24:
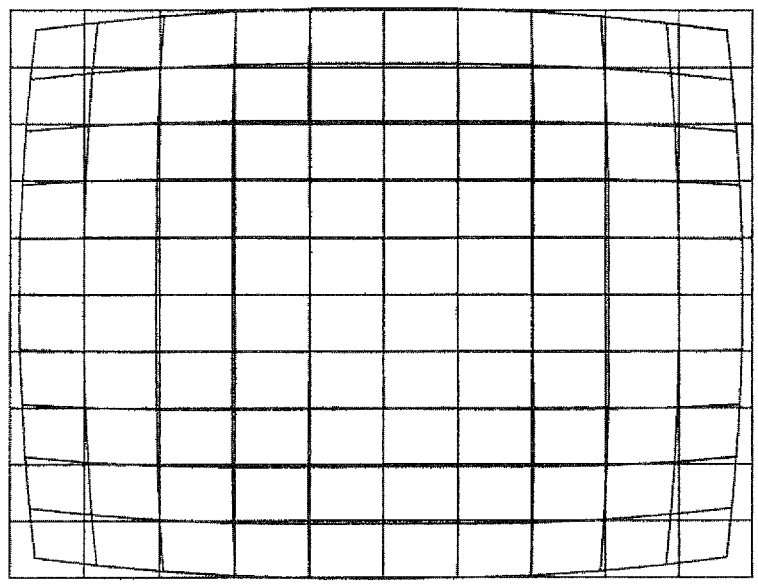
FIG. 24 is a diagram showing a distortion grid in the sixth example.

Though the imaging element 230 is a factor in generating large barrel optical distortion due to the curvature having a radius of −5.50 mm, there is a diaphragm between the first lens 221 and the second lens 223. Therefore, due to the effect of the above-described power arrangement, the lens generates a positive (pincushion) optical distortion of 25.8%, and as shown in FIG. 24, the TV distortion of the system is reduced to negative (barrel) 3.8%.

Figure 23:
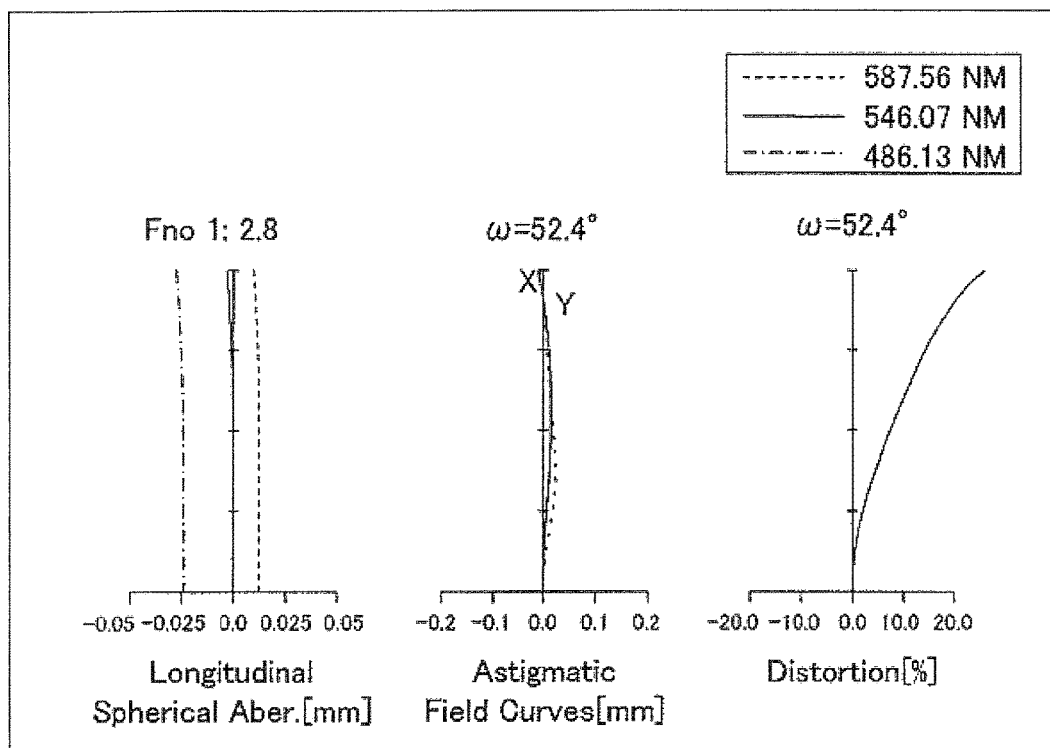
FIG. 23 is an aberration diagram showing spherical aberration (chromatic aberration), astigmatism, and distortion in a sixth example.

Then, a compact imaging system having a short optical total length of 10 mm is realized which corrects optical aberrations well, as shown in FIG. 23, while offering high brightness with an F-number Fno of 2.8 and having a wide angle, that is, a half angle of view of 52.5 degrees.

Table 21 shows the radii of curvature (R: mm), intervals (d: mm), refractive indices (nd), and dispersion values (vd) of the lenses and the glass substrate (transparent body) that correspond to the surface numbers of the lens in the sixth example.

TABLE 21

Lens configuration data in the sixth example

| Surface number | R | d | nd | vd |
|---|---|---|---|---|
| 1: | 1858.9 | 0.600 | 1.50 | 67.0 |
| 2: | 2.755 | 4.491 | | |
| 3: | 1.553 | 0.887 | 1.51 | 57.3 |
| 4: | INFINITY | 1.550 | 1.52 | 55.0 |
| 5: | INFINITY | 0.550 | 1.52 | 55.0 |
| 6: | INFINITY | 0.248 | 1.51 | 57.3 |
| 7: | −3.414 | 1.517 | | |
| IMG: | −5.500 | | | |

Table 22 shows the fourth-order, sixth-order, eighth-order, and tenth-order aspheric coefficients of the second surface of the first lens group 210, the third surface of the first lens 221 of the second lens group, and the seventh surface of the second lens 223, which include an aspheric surface in the sixth example.

In Table 22, K represents a conic constant, A represents a fourth-order aspheric coefficient, B represents a sixth-order aspheric coefficient, C represents an eighth-order aspheric coefficient, and D represents a tenth-order aspheric coefficient.

TABLE 22

Aspheric surface data in the sixth example

| | | | | |
|---|---|---|---|---|
| Second surface | K: −0.810 A: −0.608E−02 | B: 0.790E−04 | C: −0.330E−05 | D: 0.567E−07 |
| Third surface | K: −0.773 A: 0.117E−02 | B: −0.119E−03 | C: −0.315E−03 | D: −0.437E−03 |
| Seventh surface | K: −0.805 A: 0.110E+00 | B: −0.186E+00 | C: 0.284E+00 | D: −0.165E+00 |

Table 23 specifically shows the focal length f, numerical aperture F, half angle of view ω, and lens length H of the lens in the sixth example.

In this case, the focal length f is set to 1.80 [mm], the numerical aperture F is set to 2.8, the half angle of view ω is set to 52.5 deg, and the lens length H is set to 10.0 [mm].

TABLE 23

Configuration data in the sixth example f (focal length) = 1.80 mm
F (numerical aperture) = 2.8
ω (half angle of view) = 52.5 deg
H (lens total length) = 10.0 mm FIG. 23 is an aberration diagram showing spherical aberration (chromatic aberration), astigmatism, and distortion in the sixth example. (A) of FIG. 23 shows the spherical aberration (chromatic aberration), (B) of FIG. 23 shows the astigmatism, and (C) of FIG. 23 shows the distortion.

FIG. 24 is a diagram showing a distortion grid in the sixth example.

As is understood from the figures, according to the sixth example, an imaging device that excellently corrects spherical aberration, astigmatism, and distortion and includes a lens offering excellent image forming performance is obtained.

7. Seventh Embodiment

Figure 25:
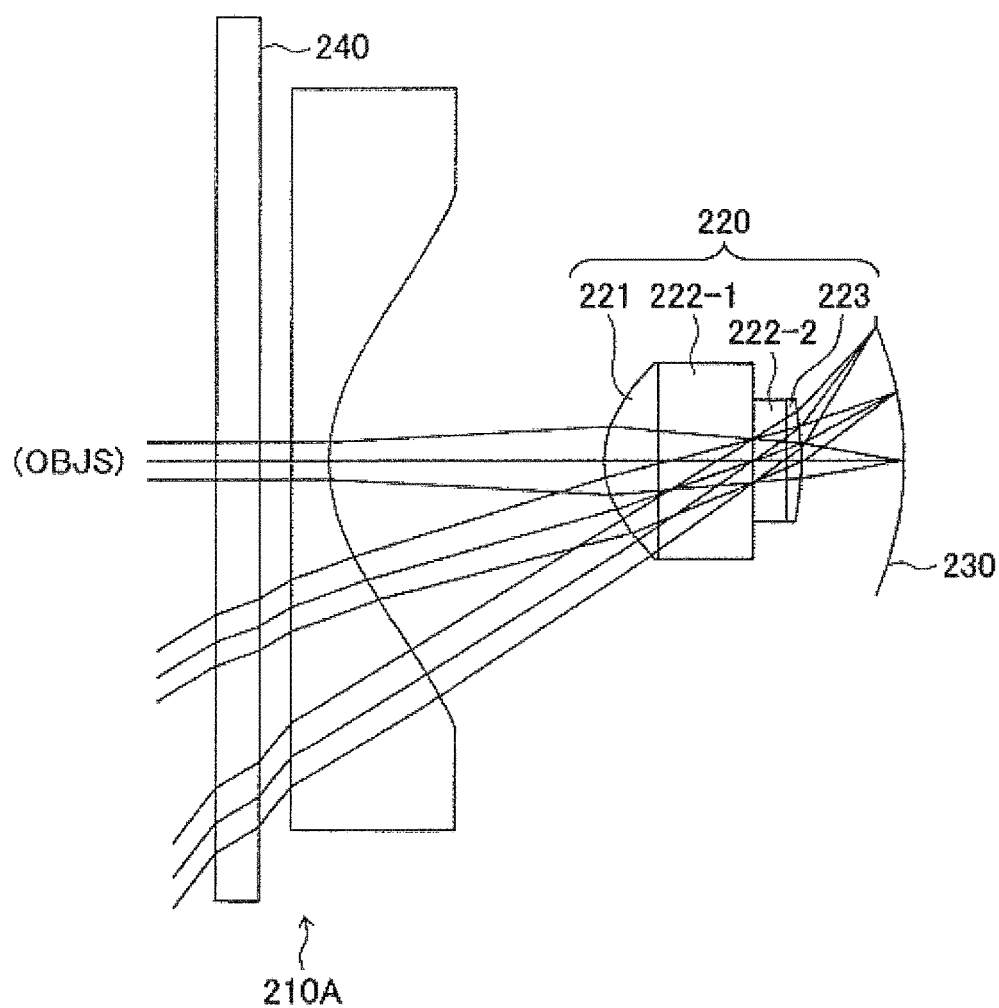
FIG. 25 is a diagram showing an example of configuration of an imaging device according to a present seventh embodiment.

FIG. 25 is a diagram showing an example of configuration of an imaging device according to a present seventh embodiment.

The imaging device 200A of FIG. 25 has a basic configuration similar to that of the imaging device 200 of FIG. 21, and is ready for outdoor use with a first lens group 210A formed of plastic and with a cover glass 240 disposed in front.

Incidentally, basic optical parameters of a seventh example corresponding to the seventh embodiment are hardly different from those of the sixth example, and therefore description thereof will be omitted here.

8. Eighth Embodiment

Figure 26:
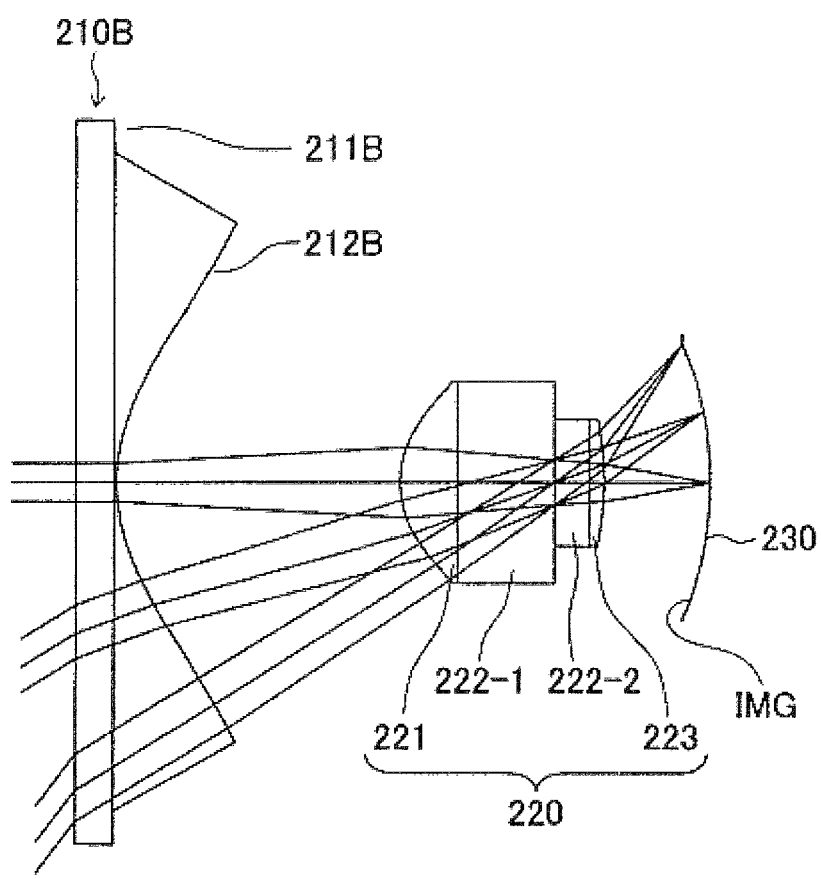
FIG. 26 is a diagram showing an example of configuration of an imaging device according to a present eighth embodiment.

FIG. 26 is a diagram showing an example of configuration of an imaging device according to a present eighth embodiment.

The imaging device 200B of FIG. 26 has a basic configuration similar to that of the imaging device 200 of FIG. 21, and uses a first lens group 210B formed by providing a replica lens 212B on a flat glass substrate 211B.

This provides a heat-resisting property to be able to resist a reflow, and the outermost glass allows outdoor use.

Further, in the imaging device 200B, both of the first lens group 210B and a second lens group 220 can be manufactured by a wafer opt, in which a large number of replica lenses are provided on a glass substrate, and are thus suitable for inexpensive mass production. Incidentally, basic optical parameters of an eighth example corresponding to the eighth embodiment are hardly different from those of the sixth example, and therefore description thereof will be omitted here.

9. Ninth Embodiment

Figure 27:
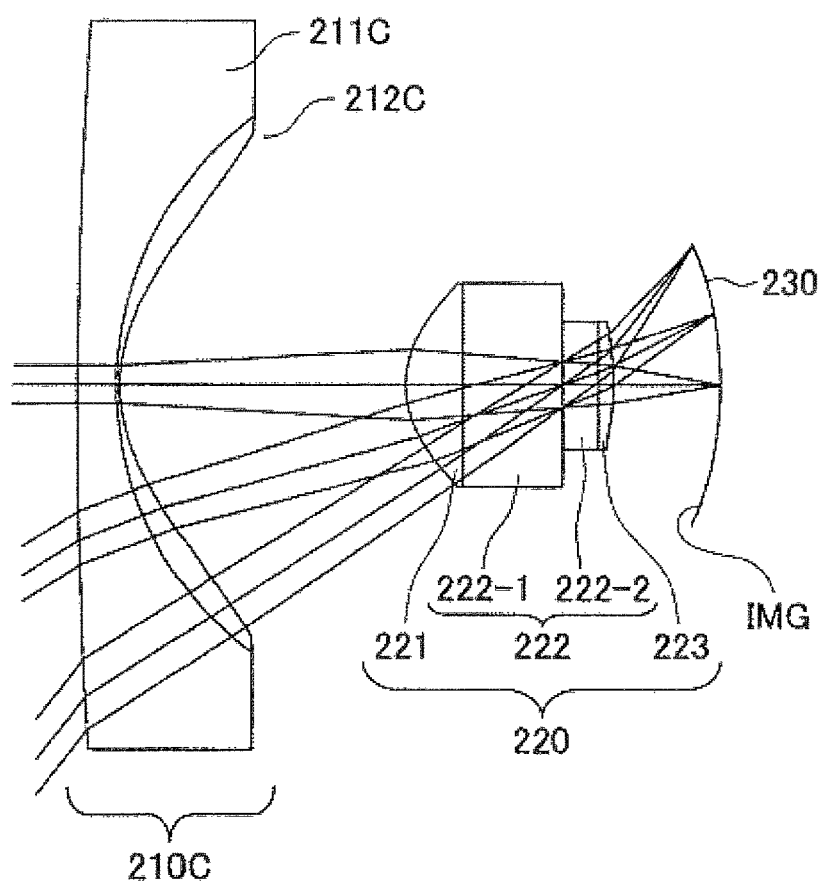
FIG. 27 is a diagram showing an example of configuration of an imaging device according to a present ninth embodiment.

FIG. 27 is a diagram showing an example of configuration of an imaging device according to a present ninth embodiment.

The imaging device 200C of FIG. 27 has a first lens group 210C including an aspheric lens having a negative power. The aspheric lens is realized by an ordinary replica lens 212C formed by providing a replica lens on the imaging surface side of a spherical glass 211C.

Figure 28:
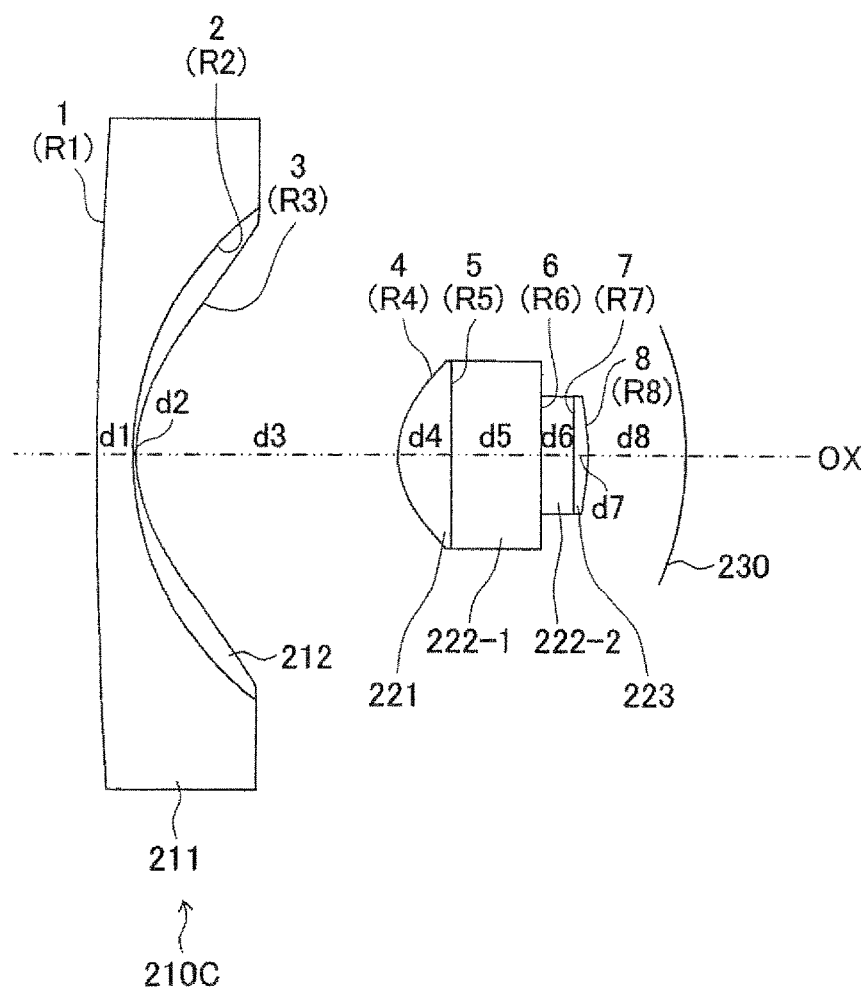
FIG. 28 is a diagram showing surface numbers given to the lenses and the substrate of the imaging device according to the present ninth embodiment.

FIG. 28 is a diagram showing surface numbers given to the lenses and the substrate of the imaging device 200C according to the present ninth embodiment.

Specifically, a surface number of number one is given to the object side surface of the spherical glass 211C of the first lens group 210C, and a surface number of number two is given to a boundary surface (bonding surface) between the image surface side surface of the spherical glass 211C and the object side surface of the replica lens 212C.

A surface number of number three is given to the image surface side surface of the replica lens 212C.

A surface number of number four is given to the object side (convex surface) surface of a first lens 221 of a second lens group 220, and a surface number of number five is given to a boundary surface (bonding surface) between the image surface side surface of the first lens 221 and the object side surface of a transparent body 222-1.

A surface number of number six is given to a boundary surface (bonding surface) between the image surface side surface of the transparent body 222-1 and the object side surface of a transparent body 222-2, and a surface number of number seven is given to a boundary surface (bonding surface) between the image surface side surface of the transparent body 222-2 and the object side surface of a second lens 223.

In addition, a surface number of number eight is given to the image surface side surface of the second lens 223.

In addition, as shown in FIG. 28, in the imaging device 200C of the present embodiment, the radius of curvature of the center of the object side surface (number one) 1 of the first lens group 210C is set as R1.

The radius of curvature of the center of the boundary surface (bonding surface) between the image surface side surface 2 of the spherical glass 211C and the object side surface of the replica lens 212C is set as R2.

The radius of curvature of the center of the image surface side surface 2 of the replica lens 212C of the first lens group 210C is set as R3.

The radius of curvature of the center of the object side (convex surface) surface 4 of the first lens 221 of the second lens group 220 is set as R4, and the radius of curvature of the center of the boundary surface (bonding surface) 5 between the image surface side surface of the first lens 221 and the object side surface of the transparent body 222-1 is set as R5.

The radius of curvature of the center of the boundary surface (bonding surface) 6 between the image surface side surface of the transparent body 222-1 and the object side surface of the transparent body 222-2 is set as R6, and the radius of curvature of the center of the image surface side surface of the transparent body 222-2 and the object side surface 7 of the second lens 223 is set as R7.

In addition, the radius of curvature of the center of the image surface side surface 8 of the second lens 223 is set as R8.

Incidentally, the radii of curvature R5, R6, and R7 of the centers of the surfaces 5, 6, and 7 are infinite (INFINITY).

In addition, as shown in FIG. 28, a distance on the optical axis OX between the surface 1 and the surface 2 as thickness of the spherical lens 211C of the first lens group 210C is set as d1, and a distance on the optical axis OX between the surface 2 and the surface 3 as thickness of the replica lens 212C is set as d2.

A distance on the optical axis OX between the image surface side surface 3 of the replica lens 212C of the first lens group 210C and the object side surface 4 of the first lens 221 of the second lens group 220 is set as d3.

A distance on the optical axis OX between the surface 4 and the surface 5 as thickness of the first lens 221 is set as d4.

A distance on the optical axis OX between the surface 5 and the surface 6 as thickness of the transparent body 222-1 is set as d5.

A distance on the optical axis OX between the surface 6 and the surface 7 as thickness of the transparent body 222-2 is set as d6.

A distance on the optical axis OX between the surface 7 and the surface 8 as thickness of the second lens 223 is set as d7, and a distance on the optical axis OX between the image surface side surface of the second lens 223 and an image surface IMG is set as d8.

A ninth example based on concrete numerical values of the lenses of the imaging device 200C of FIG. 27 is shown in the following. Incidentally, in the ninth example, the surface numbers as shown in FIG. 28 are given to the lenses and the transparent body.

Ninth Example

The numerical values of the ninth example are shown in Table 24, Table 25, and Table 26. The numerical values of the ninth example correspond to FIG. 27.

The ninth example is a design example of a vehicle-mounted camera, a PC camera, a surveillance camera, or the like for a 1.3-M CMOS imager having a ¼ size and a 2.8-µm pitch.

The present ninth example includes an imaging element 230 curved so as to have a concave surface facing the object side and two groups of lenses. As for the lenses, the first lens group 210C includes an aspheric lens having a negative power. The aspheric lens is realized by an ordinary replica lens 212C formed by providing the replica lens 212C on the imaging surface side of the spherical glass 211C.

The second lens group 220 includes the first lens 221 whose object side surface has a convex shape projecting to the object side, the glass substrate (transparent body) 222 provided with a diaphragm and an infrared cutoff filter, and the second lens 223 having a weak power, with the first lens 221, the transparent body 222, and the second lens 223 arranged in order from the object side to the image surface side without an air being interposed therebetween.

The first lens 221 is desirably realized by providing a UV curing replica lens on the diaphragm or on an opposite surface from the diaphragm on the glass substrate provided with the IR cutoff filter.

In addition, the second lens 223 is desirably realized by providing a UV curing replica lens on the glass substrate 222. In this case, the second lens 223 may be provided on the back of the first lens 221, or the first lens 221 and the second lens 223 may be provided on separate glass substrates and the glass substrates may be laminated to each other.

The first lens 221 and the second lens 223 can be formed on a D263T glass substrate from Schott by a replica process using an NT33 glass material from Nitto Denko Corporation.

As for a power arrangement, the first lens group 210C has a strong negative power and a focal length of −5.20 mm, and the second lens group 220 has a weak positive power and a focal length of 2.64 mm. Because the optical system has a focal length of 1.735 mm, −3.00 is obtained for the conditional expression (1), and 1.48 is obtained for the conditional expression (2), so that the requirements of the conditional expressions are satisfied.

Figure 29:
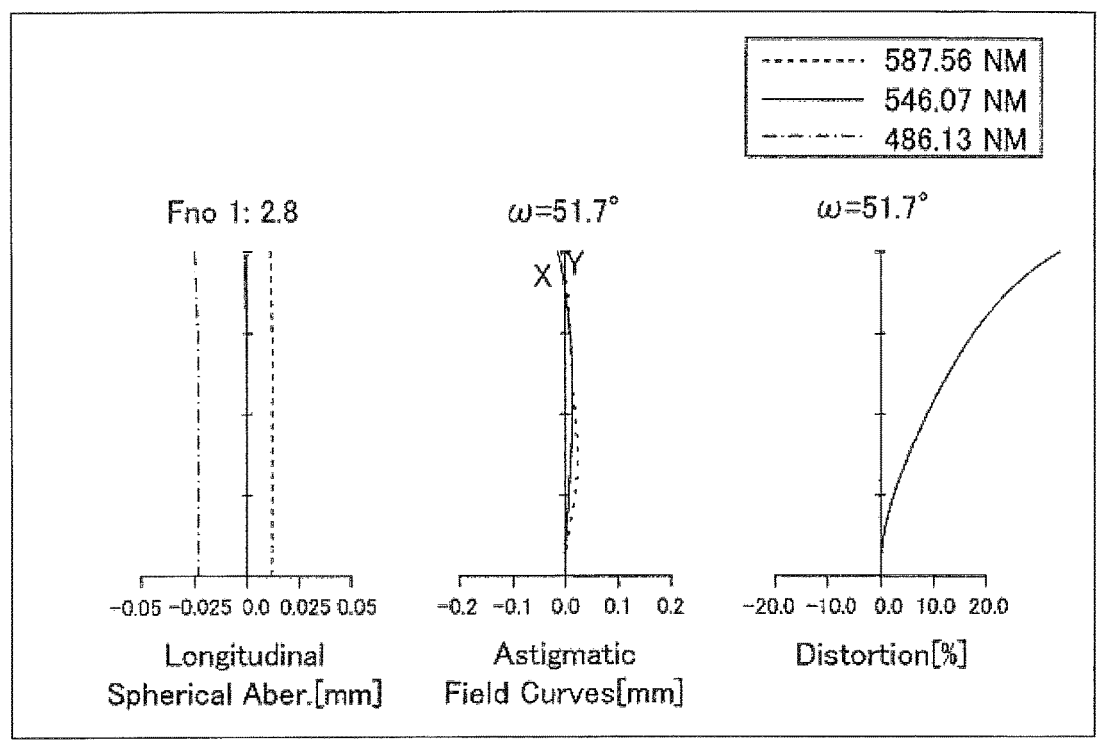
FIG. 29 is an aberration diagram showing spherical aberration (chromatic aberration), astigmatism, and distortion in a ninth example.

Though the imaging element 230 is a factor in generating large barrel optical distortion due to the curvature having a radius of −5.70 mm, there is a diaphragm between the first lens 221 and the second lens 223. Therefore, due to the effect of the above-described power arrangement, the lens generates a positive (pincushion) optical distortion of 34.0%, and as shown in FIG. 29, the TV distortion of the system is reduced to negative (barrel) 2.0%.

Figure 30:
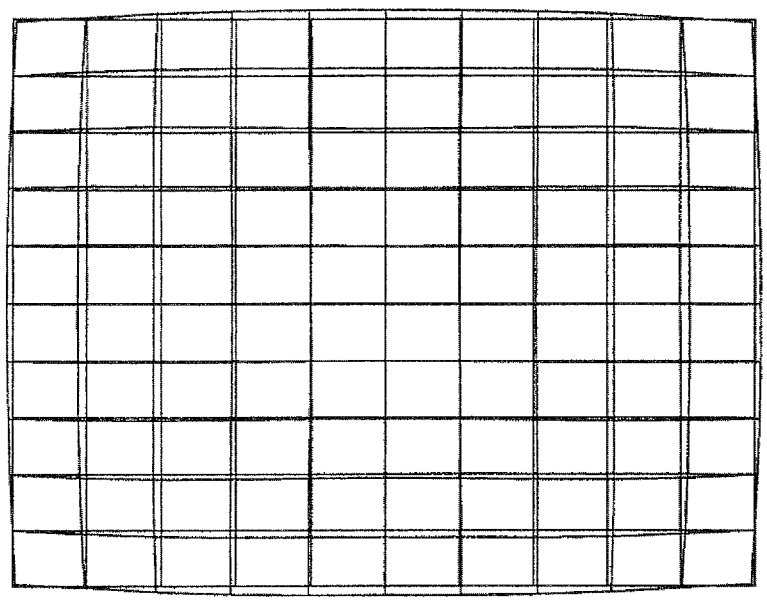
FIG. 30 is a diagram showing a distortion grid in the ninth example.

Then, a compact imaging system having a short optical total length of 10 mm is realized which corrects optical aberrations well, as shown in FIG. 30, while offering high brightness with an F-number Fno of 2.8 and having a wide angle, that is, a half angle of view of 51.8 degrees.

Table 24 shows the radii of curvature (R: mm), intervals (d: mm), refractive indices (nd), and dispersion values (vd) of the lenses and the glass substrate (transparent body) that correspond to the surface numbers of the lens in the ninth example.

TABLE 24

Lens configuration data in the ninth example

| Surface number | R | d | nd | vd |
|---|---|---|---|---|
| 1: | 85.70 | 0.600 | 1.50 | 67.0 |
| 2: | 5.236 | 0.050 | 1.51 | 57.3 |
| 3: | 2.550 | 4.441 | | |
| 4: | 1.553 | 0.887 | 1.51 | 57.3 |
| 5: | INFINITY | 1.550 | 1.52 | 55.0 |
| 6: | INFINITY | 0.550 | 1.52 | 55.0 |
| 7: | INFINITY | 0.248 | 1.51 | 57.3 |
| 8: | −3.108 | 1.674 | | |
| IMG: | −5.700 | | | |

Table 25 shows the fourth-order, sixth-order, eighth-order, and tenth-order aspheric coefficients of the third surface of the first lens group 210C, the fifth surface of the first lens 221 of the second lens group, and the eighth surface of the second lens 223, which include an aspheric surface in the ninth example.

In Table 25, K represents a conic constant, A represents a fourth-order aspheric coefficient, B represents a sixth-order aspheric coefficient, C represents an eighth-order aspheric coefficient, and D represents a tenth-order aspheric coefficient.

TABLE 25

Aspheric surface data in the ninth example

| | | | | |
|---|---|---|---|---|
| Third surface | K: −0.883 | A: −0.574E−02 | B: 0.698E−04 | C: −0.358E−05 | D: 0.834E−07 |
| Fourth surface | K: −0.782 | A: 0.874E−03 | B: −0.256E−03 | C: −0.589E−03 | D: −0.400E−03 |
| Eighth surface | K: 0.965 | A: 0.121E+00 | B: −0.185E+00 | C: 0.283E+00 | D: −0.162E+00 |

Table 26 specifically shows the focal length f, numerical aperture F, half angle of view ω, and lens length H of the lens in the ninth example.

In this case, the focal length f is set to 1.735 [mm], the numerical aperture F is set to 2.8, the half angle of view ω is set to 51.8 deg, and the lens length H is set to 10.0 [mm].

TABLE 26

Configuration data in the ninth example f (focal length) = 1.735 mm
F (numerical aperture) = 2.8
ω (half angle of view) = 51.8 deg
H (lens total length) = 10.0 mm FIG. 29 is an aberration diagram showing spherical aberration (chromatic aberration), astigmatism, and distortion in the ninth example. (A) of FIG. 29 shows the spherical aberration (chromatic aberration), (B) of FIG. 29 shows the astigmatism, and (C) of FIG. 29 shows the distortion.

FIG. 30 is a diagram showing a distortion grid in the ninth example.

As is understood from the figures, according to the ninth example, an imaging device that excellently corrects spherical aberration, astigmatism, and distortion and includes a lens offering excellent image forming performance is obtained.

10. Tenth Embodiment

Figure 31:
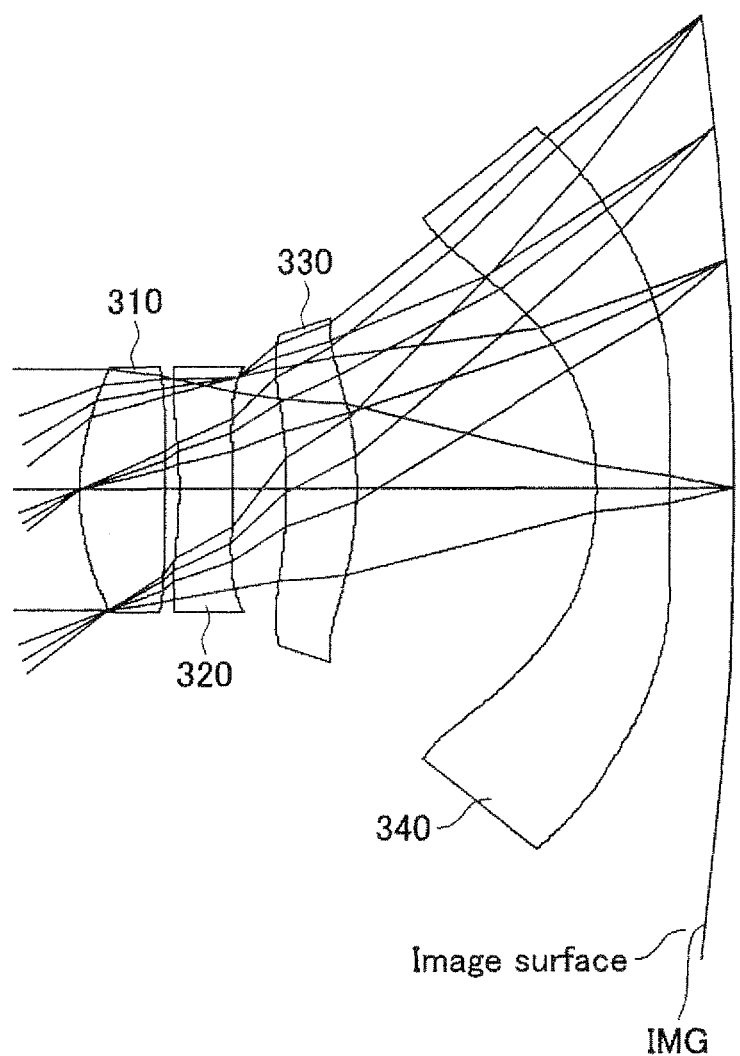
FIG. 31 is a diagram showing an example of configuration of an imaging device according to a present tenth embodiment.

FIG. 31 is a diagram showing an example of configuration of an imaging device according to a present tenth embodiment.

Figure 32:
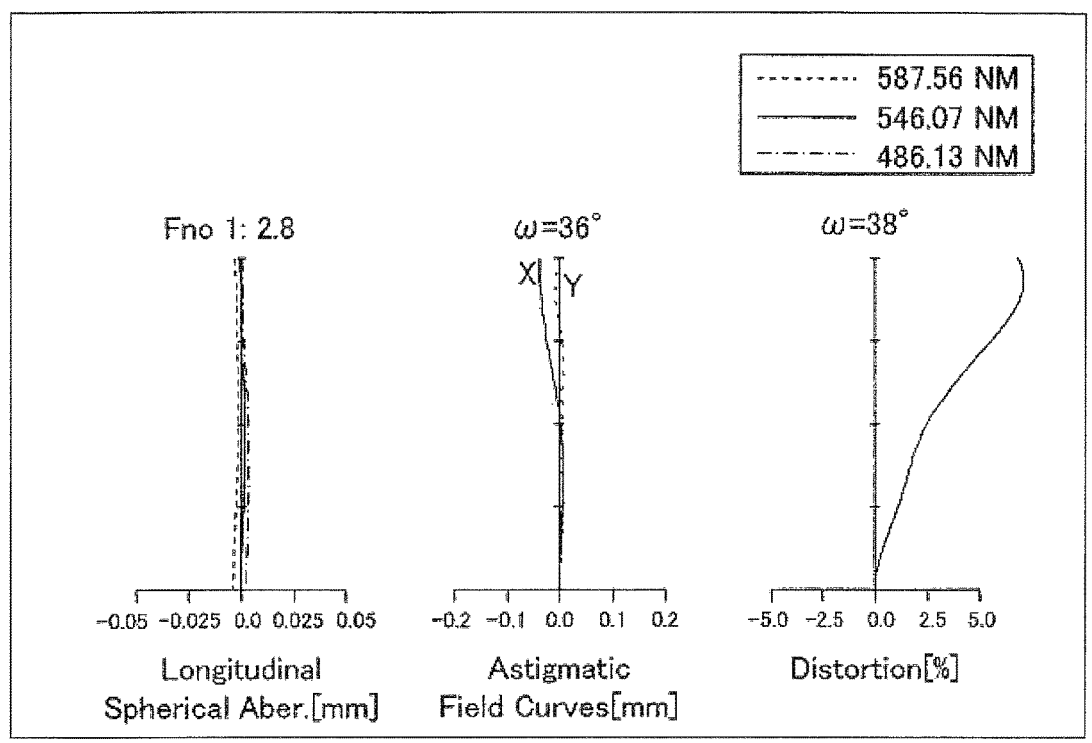
FIG. 32 is an aberration diagram showing spherical aberration (chromatic aberration), astigmatism, and distortion in the imaging device of FIG. 31.

FIG. 32 is an aberration diagram showing spherical aberration (chromatic aberration), astigmatism, and distortion in the imaging device of FIG. 31. (A) of FIG. 32 shows the spherical aberration (chromatic aberration), (B) of FIG. 32 shows the astigmatism, and (C) of FIG. 32 shows the distortion.

Figure 33:
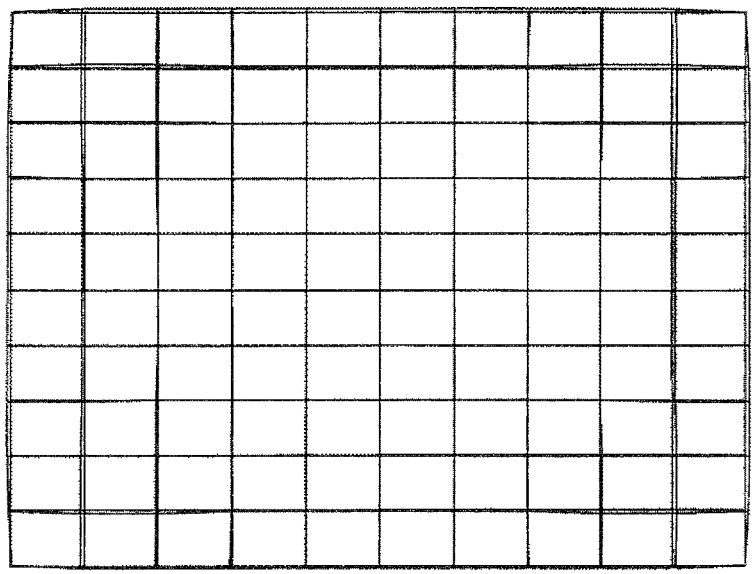
FIG. 33 is a diagram showing a distortion grid in the imaging device.

FIG. 33 is a diagram showing a distortion grid in the imaging device of FIG. 31.

The imaging device 300 of FIG. 31 represents an example in which a curved sensor is used for a four-group lens, which is currently standard as a lens of a camera module for a mobile telephone.

The present example is a design example for 13 M of a 1/3.06 size using a sensor having a 1.12-μm pitch. Configuration data includes an F-number Fno of 2.8, a focal length of 3.66 mm, an optical total length of 4.0 mm, and a horizontal angle of view of 63.0 degrees. While positive (pincushion) optical distortion is generated as shown in FIG. 32, the imaging element is curved and thereby TV distortion is reduced as shown in FIG. 33.

In ordinary design in which the imaging device 200 is flat, equal optical performance cannot be delivered unless the optical total length is about 4.4 mm. Thus, because the imaging element is curved, overall aberration correction becomes favorable, and the optical total length can be shortened.

Basically, any configuration of any number of lenses in any number of groups can produce similar effects to the above by using the curvature of a sensor (imaging element) and a lens producing positive optical distortion.

11. Eleventh Embodiment

Figure 34:
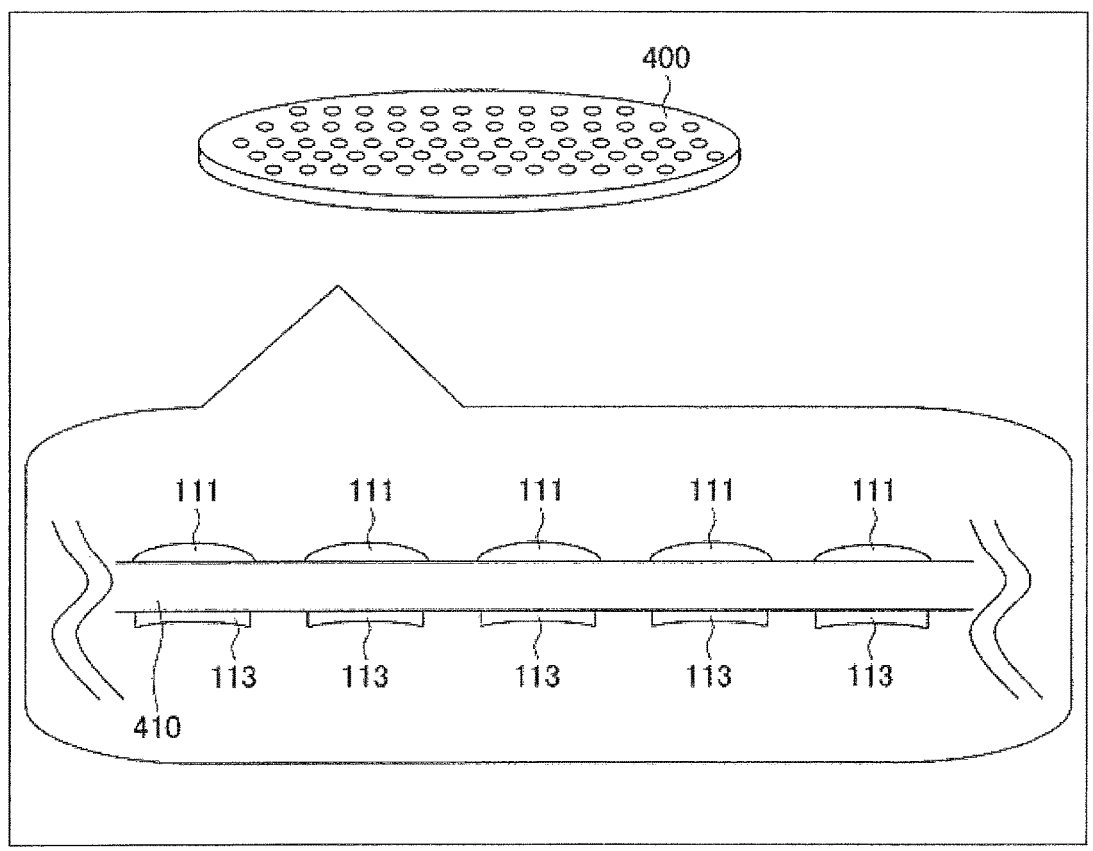
FIG. 34 is a diagram conceptually showing wafer-level optics according to a sixth embodiment.

FIG. 34 is a diagram conceptually showing wafer-level optics according to a present eleventh embodiment.

A large number of lenses of the present embodiment are desirably produced on a wafer 400 simultaneously. FIG. 34 shows the concept.

FIG. 34 is a conceptual diagram showing a large number of lenses simultaneously provided by a replica process on and under a glass substrate 410 provided with an infrared cutoff filter and a flare diaphragm.

One-group lenses and two-group lenses according to the present embodiment can be fabricated by thus producing a large number of lenses on the glass substrate 410 by a manufacturing method using a replica process and cutting the lenses individually.

In addition, imaging elements may be produced by bonding the above-described lens wafer and a sensor wafer to each other in a wafer state and cutting the imaging elements individually.

As described above, the present embodiment realizes an imaging device formed by curving an imaging element in which provision can be made for a high pixel count, and using a lens of a one-group configuration.

According to the present embodiment, the following effects can be obtained.

1) An optical system can be constructed in which a diaphragm and an infrared cutoff filter can be provided on a substrate, a middle diaphragm can be formed, optical aberrations are corrected efficiently, and the infrared cutoff filter does not need to be placed as a separate part.

2) The lens is formed by one group laminated to a glass substrate. Thus, accuracy is determined by a lens manufacturing process, and a problem in assembly of a plurality of lenses, a problem in reliability after the manufacturing of the lens, and the like do not occur.

3) With a structure in which provision can be made for a high pixel count by laminating lens elements without an air interval therebetween, higher performance can be achieved easily without the basic structure being changed.

4) Negative optical distortion generated by curving the imaging element can be cancelled out by positive optical distortion generated by the lens system, and an effect of simplifying the lens, which effect is obtained by curving the imaging element, can be maximized.

Then, a wide-angle lens with a small optical distortion and a simple structure can be realized.

5) Curving the imaging element reduces a need for image surface correction by the lens. Hence, the lens can be formed by one group. Curving the imaging element reduces a need for image surface correction by the lens. Hence, a wide-angle lens can be formed by two groups. Three groups or more have generally been necessary to form a wide-angle lens. Thus, a reduction in size and a reduction in cost can be achieved.

6) The surface of incidence on the object side of the lens is a convex surface. Thus, there is small difference in angle of incidence on the lens according to image height, and chromatic aberration does not easily occur.

7) Provisions can be made for various angles of view from a narrow angle to a wide angle due to the above-described effects.

8) An imaging device having a small projection area can be realized.

9) The lens can be formed by a reflowable glass material, which has generally been difficult with an inexpensive wide-angle lens, and an optimum system for a reflowable wide-angle camera or a vehicle-mounted camera can be formed.

10) The lens can be produced in the form of a wafer, and can be mass-produced at low cost.

11) Because the lens is formed by one group of lenses, there are small variations in focus direction between the individual lenses.

12) For these reasons, a camera module can be produced by laminating a lens wafer and a sensor wafer, and the camera module can be mass-produced inexpensively.

13) When a curved imaging element is used for an ordinary optical system, a short optical length that has generally been impossible can be achieved.

The imaging devices 100, 100A to 100D, 200, 200A to 200C having features as described above can be applied as a lens for a digital camera using an imaging element such as a CCD, a CMOS sensor, or the like, particularly a camera included in a small electronic apparatus such as a mobile telephone or the like.

12. Twelfth Embodiment

Figure 35:
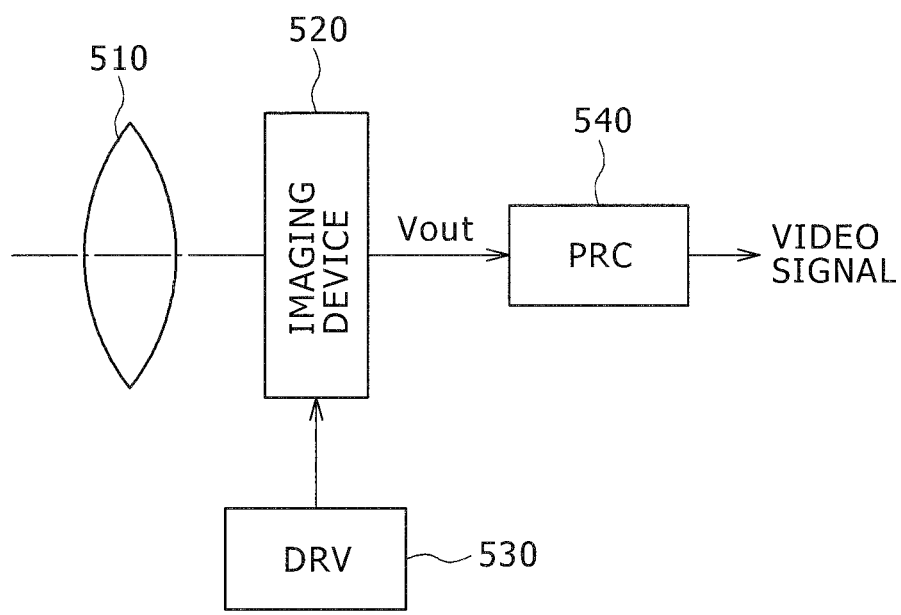
FIG. 35 is a block diagram showing an example of configuration of an electronic apparatus adopting an imaging device according to a present embodiment.

FIG. 35 is a block diagram showing an example of configuration of an electronic apparatus adopting an imaging device according to a present embodiment.

As shown in FIG. 35, the present electronic apparatus 500 includes an optical system 510, to which the imaging devices 100, 100A to 100D, 200, 200A to 200C according to the present embodiment are applied, and an imaging device 520, to which a CCD or a CMOS image sensor (solid-state imaging element) is applicable.

The optical system 510 forms a subject image by guiding incident light to an imaging surface including a pixel region of the imaging device 520.

The electronic apparatus 500 further includes a driving circuit (DRV) 530 that drives the imaging device 520 and a signal processing circuit (PRC) 540 that processes the output signal of the imaging device 520.

The driving circuit 530 includes a timing generator (not shown) that generates various kinds of timing signals including a start pulse or a clock pulse for driving circuits within the imaging device 520, and drives the imaging device 520 with a predetermined timing signal.

In addition, the signal processing circuit 540 performs predetermined signal processing on the output signal of the imaging device 520. The signal processing circuit 540 can also make distortion correction at the time of the signal processing according to the output signal of the imaging device 520, for example.

The image signal processed by the signal processing circuit 540 is recorded on a recording medium such as a memory, for example. A hard copy of the image information recorded on the recording medium is produced by a printer or the like. In addition, the image signal processed by the signal processing circuit 540 is displayed as a moving image on a monitor formed by a liquid crystal display or the like.

As described above, a camera with low power consumption and high precision can be realized by including the above-described imaging devices 100, 100A to 100D, 200, 200A to 200C as the optical system 510 and the imaging device 520 in an imaging apparatus such as a digital still camera or the like.

It is to be noted that the present technology can also adopt the following constitutions.

(1) An imaging device including:
one group of lenses; and
an imaging element on which an image is formed through the lenses;
wherein the lenses include
a first lens having an object side surface in a convex shape projecting to an object side,
a transparent body, and
a second lens, the first lens, the transparent body, and the second lens being arranged in order from the object side to an image surface side without an air being interposed between the first lens, the transparent body, and the second lens, and the imaging element is curved so as to have a concave surface facing the object side.

(2) The imaging device according to the above (1), wherein the transparent body is formed by a glass plate or a plate similar to plastic.

(3) The imaging device according to the above (1) or (2), wherein a diaphragm is disposed in the lens group.

(4) The imaging device according to any one of the above (1) to (3), wherein an infrared cutoff filter is disposed in the lens group.

(5) The imaging device according to any one of the above (1) to (4), wherein the first lens has a doublet structure of a first lens element and a second lens element arranged in order from the object side.

(6) The imaging device according to the above (5), wherein the first lens element is formed by a biconvex lens.

(7) The imaging device according to any one of the above (1) to (4), wherein the first lens has a triplet structure of a first lens element, a second lens element, and a third lens element arranged in order from the object side.

(8) The imaging device according to the above (7), wherein the second lens element has a smaller Abbe number than the first lens element and the third lens element.

(9) The imaging device according to any one of the above (1) to (8), wherein the second lens at least has a doublet structure of a fourth lens element and a fifth lens element.

(10) The imaging device according to any one of the above (5) to (9), wherein at least one lens element is formed by an ultraviolet curing resin.

(11) The imaging device according to any one of the above (1) to (10), wherein a focal length fL1 of the first lens and a focal length fL2 of the second lens satisfy following conditional expressions:

$$1.0 \le fL1/f \le 100.0$$

$$1.5 \le fL2/f \text{ or } fL2 \le -3.0$$

where f is a focal length of a lens system.

(12) The imaging device according to any one of the above (1) to (11), wherein a radius of curvature Ri of an image surface of the imaging element satisfies a following conditional expression:

$$-5 \le Ri/f \le -0.6$$

where f is a focal length of a lens system.

(13) An imaging device including:

a lens group having a positive optical distortion; and an imaging element on which an image is formed through the lens group;

wherein the imaging element is curved so as to have a concave surface facing an object side, and a negative optical distortion produced by the curvature of the imaging element is cancelled out by the positive optical distortion of the lens group.

(14) An imaging device including:

two groups of lenses; and an imaging element on which an image is formed through the lenses;

wherein the lenses include a first lens group, and a second lens group, the first lens group and the second lens group being arranged in order from an object side to an image surface side, the second lens group including a first lens having an object side surface in a convex shape projecting to the object side, a transparent body, and a second lens, the first lens, the transparent body, and the second lens being arranged in order without an air being interposed between the first lens, the transparent body, and the second lens.

(15) The imaging device according to the above (14), wherein the second lens group includes a first replica lens, a glass substrate, and a second replica lens, the first replica lens, the glass substrate, and the second replica lens being arranged in order from the object side to the image surface side without an air being interposed between the first replica lens, the glass substrate, and the second replica lens.

(16) The imaging device according to the above (14) or (15), wherein the first lens group is formed by a glass mold, plastic, or a casting type lens.

(17) The imaging device according to the above (14) or (15), wherein the first lens group is formed by a lens formed by providing a replica lens on a spherical glass lens.

(18) The imaging device according to the above (14) or (15), wherein the first lens group is formed by a lens formed by providing a replica lens on a glass plate.

(19) The imaging device according to any one of the above (13) to (18), wherein a focal length fG1 of the first lens group and a focal length fG2 of the second lens group satisfy following conditional expressions:

$$-10 \le fG1/f \le -1.0$$

$$0.9 \le fG2/f \le 5.0$$

where f is a focal length of a lens system.

(20) The imaging device according to any one of the above (13) to (19), wherein a radius of curvature Ri of an image surface of the imaging element satisfies a following conditional expression:

$$-40 \le Ri/f \le -0.6$$

where f is a focal length of a lens system.

(21) The imaging device according to any one of the above (1) to (20), wherein the lens group has a positive optical distortion, and corrects a negative optical distortion produced by the curvature of the imaging element.

(22) The imaging device according to any one of the above (1) to (21), wherein the optical distortion of the lens group is positive 4% or more.

(23) The imaging device according to any one of the above (1) to (22), wherein distortion correction is made at a time of signal processing according to an output signal of the imaging element.

(24) An electronic apparatus including:
an imaging device; and
a signal processing circuit for performing signal processing on an output signal of the imaging device;
wherein the imaging device includes
one group of lenses, and
an imaging element on which an image is formed through the lenses, and
the lenses include
a first lens having an object side surface in a convex shape projecting to an object side,
a transparent body, and
a second lens,
the first lens, the transparent body, and the second lens being arranged in order from the object side to an image surface side without an air being interposed between the first lens, the transparent body, and the second lens, and
the imaging element is curved so as to have a concave surface facing the object side.

(25) An electronic apparatus including:
an imaging device; and
a signal processing circuit for performing signal processing on an output signal of the imaging device;
wherein the imaging device includes
a lens group having a positive optical distortion, and
an imaging element on which an image is formed through the lens group, and
the imaging element is curved so as to have a concave surface facing an object side, and a negative optical distortion produced by the curvature of the imaging element is cancelled out by the positive optical distortion of the lens group.

REFERENCE SIGNS LIST 100, 100A to 100D . . . Imaging device, 110, 110A to 110D . . . Lens, 111, 111A to 111D . . . First lens, 1111 . . . First lens element, 1112 . . . Second lens element, 1113 . . . Third lens element, 112, 112A to 112D . . . Glass substrate, 113, 113A to 113D . . . Second lens, 1131 . . . Fourth lens element, 1132 . . . Fifth lens element, 120, 120A to 120D . . . Imaging device, 200, 200A to 200D . . . Imaging device, 210 . . . First lens group, 211 . . . Spherical lens, 212 . . . Replica lens, 220 . . . Second lens group, 221 . . . First lens, 222 . . . Transparent body (glass substrate), 223 . . . Second lens, 500 . . . Imaging device, 510 . . . Optical system, 320 . . . Imaging device, 530 . . . Driving circuit (DRV), 540 . . . Signal processing circuit (PRC).

The invention claimed is:

1. An imaging device, comprising: a group of lenses; and an imaging element on which an image is generated through the group of lenses, wherein the group of lenses includes a first lens, at least one transparent body, and a second lens, wherein the first lens has an object side surface in a convex shape, wherein the object side surface projects to an object side, wherein the first lens, the at least one transparent body, and the second lens are arranged, respectively, from the object side to an image surface side, wherein interposition of air between the first lens, the at least one transparent body, and the second lens is avoided, wherein the first lens has a first positive power and the second lens has a second positive power, and the second positive power is smaller than the first positive power, wherein the imaging element comprises an image sensor, wherein the imaging element has a concave surface that faces the object side, wherein the group of lenses has a positive optical distortion based on the first positive power of the first lens and the second positive power of the second lens, and the group of lenses is configured to correct a negative optical distortion, produced by a curvature of the image sensor, based on the positive optical distortion, and wherein a focal length (fL1) of the first lens and a focal length (fL2) of the second lens satisfy following conditional expressions: $1.0 \leq fL1/f \leq 100.0$, and $1.5 \leq fL2/f$, where f is a focal length of a lens system.

2. The imaging device according to claim 1, wherein the at least one transparent body comprises one of a glass plate or a plastic plate.

3. The imaging device according to claim 1, wherein a diaphragm is present in the group of lenses.

4. The imaging device according to claim 1, wherein an infrared cutoff filter is present in the group of lenses.

5. The imaging device according to claim 1,
wherein the first lens has a doublet structure of a first lens element and a second lens element, and
wherein the first lens element and the second lens element are arranged, respectively, from the object side.

6. The imaging device according to claim 5, wherein the first lens element comprises a biconvex lens.

7. The imaging device according to claim 1,
wherein the first lens has a triplet structure of a first lens element, a second lens element, and a third lens element, and
wherein the first lens element, the second lens element, and the third lens element are arranged, respectively, from the object side.

8. The imaging device according to claim 7, wherein the second lens element has a smaller Abbe number than each of the first lens element or the third lens element.

9. The imaging device according to claim 1, wherein the second lens has a doublet structure of a first lens element and a second lens element.

10. The imaging device according to claim 5, wherein at least one of the first lens element or the second lens element comprises an ultraviolet curing resin.

11. The imaging device according to claim 1, wherein a radius of curvature (Ri) of an image surface of the imaging element satisfies a following conditional expression:

$$-5 \leq Ri/f \leq -0.6$$

where f is the focal length of the lens system.

12. The imaging device according to claim 1, wherein the group of lenses is further configured to generate the positive optical distortion with a value greater than or equal to a threshold value.

13. The imaging device according to claim 1, wherein the correction of the negative optical distortion is made at a time of signal processing based on an output signal of the imaging element.

14. The imaging device according to claim 1,
wherein the first lens is on a first transparent body of the at least one transparent body,
wherein the second lens is on a second transparent body of the at least one transparent body, and
wherein a flat surface of the first transparent body is bonded to a flat surface of the second transparent body.

* * * * *